(12) United States Patent
Tsai et al.

(10) Patent No.: US 9,097,877 B2
(45) Date of Patent: Aug. 4, 2015

(54) IMAGE LENS ASSEMBLY AND IMAGE CAPTURING DEVICE

(71) Applicant: LARGAN PRECISION CO., LTD., Taichung (TW)

(72) Inventors: Tsung-Han Tsai, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 114 days.

(21) Appl. No.: 13/954,987

(22) Filed: Jul. 31, 2013

(65) Prior Publication Data

US 2015/0029383 A1   Jan. 29, 2015

(30) Foreign Application Priority Data

Jul. 23, 2013   (TW) .............................. 102126302 A

(51) Int. Cl.

| | | |
|---|---|---|
| *G02B 3/02* | (2006.01) | |
| *G02B 9/60* | (2006.01) | |
| *G02B 13/00* | (2006.01) | |
| *G02B 3/04* | (2006.01) | |
| G02B 13/04 | (2006.01) | |
| G02B 13/18 | (2006.01) | |

(52) U.S. Cl.
CPC .............. *G02B 13/0045* (2013.01); *G02B 3/04* (2013.01); *G02B 9/60* (2013.01); *G02B 13/04* (2013.01); *G02B 13/18* (2013.01)

(58) Field of Classification Search
CPC ...... G02B 13/0045; G02B 9/60; G02B 13/18; G02B 9/00
USPC .......................... 359/714, 740, 746, 764, 767
See application file for complete search history.

(56) References Cited

U.S. PATENT DOCUMENTS

| | | | |
|---|---|---|---|
| 7,502,181 B2 * | 3/2009 | Shinohara ..................... 359/764 |
| 8,576,497 B2 * | 11/2013 | Hsu et al. ...................... 359/714 |
| 2010/0315723 A1 * | 12/2010 | Noda ............................. 359/714 |
| 2014/0029117 A1 * | 1/2014 | Noda ............................. 359/714 |
| 2014/0098428 A1 * | 4/2014 | Shinohara ..................... 359/714 |
| 2014/0198396 A1 * | 7/2014 | Hsu et al. ...................... 359/714 |
| 2015/0014515 A1 | 1/2015 | Lin et al. |
| 2015/0015767 A1 | 1/2015 | Lin et al. |
| 2015/0015772 A1 | 1/2015 | Lin et al. |

\* cited by examiner

*Primary Examiner* — Evelyn A Lester

(74) *Attorney, Agent, or Firm* — CKC & Partners Co., Ltd.

(57) ABSTRACT

An image lens assembly includes five lens elements with refractive power, in order from an object side to an image side, a first lens element, a second lens element, a third lens element, a fourth lens element and a fifth lens element. The first lens element has refractive power. The second lens element with positive refractive power has a convex image-side surface in a paraxial region thereof. The third lens element has positive refractive power. The fourth lens element with refractive power has a concave image-side surface in a paraxial region thereof, wherein the surfaces thereof are aspheric. The fifth lens element with refractive power has a concave image-side surface in a paraxial region thereof, wherein the image-side surface of the fifth lens element has at least one convex shape in an off-axis region thereof, and the surfaces thereof are aspheric.

23 Claims, 19 Drawing Sheets

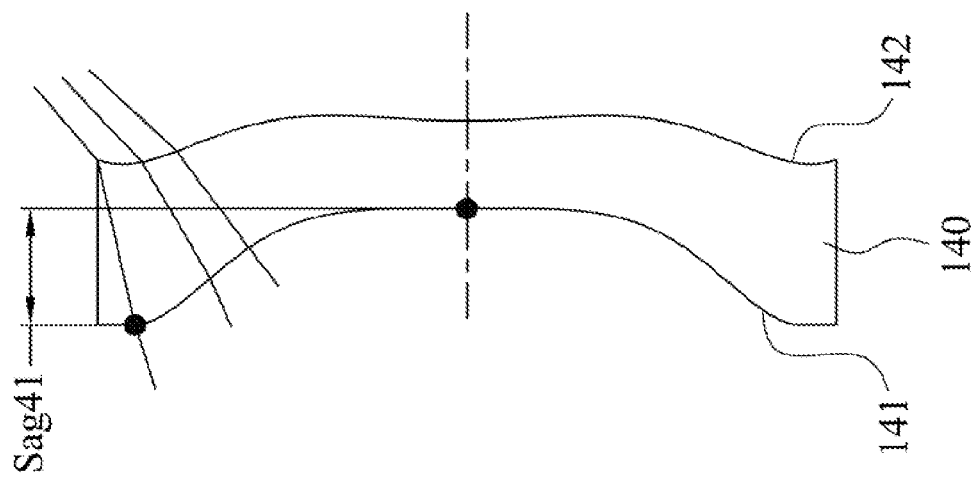

IMAGE LENS ASSEMBLY AND IMAGE CAPTURING DEVICE

RELATED APPLICATIONS

This application claims priority to Taiwan Application Serial Number 102126302, filed Jul. 23, 2013, which is incorporated by reference herein in its entirety.

BACKGROUND

1. Technical Field

The present disclosure relates to an image lens assembly. More particularly, the present disclosure relates to a compact image lens assembly applicable to portable electronic products.

2. Description of Related Art

In recent years, with the popularity of mobile products having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in a portable electronic product mainly adopts a four-element lens structure lens structure. Due to the popularity of mobile products with high-end specifications, such as smart phones and tablet personal computers, the requirements for high resolution and image quality of present compact optical systems increase significantly. However, the conventional optical systems with four-element lens structure cannot satisfy these requirements of the compact optical systems.

Other conventional compact optical systems with five-element lens structure enhance image quality and resolution. However, the image tends to be distorted while the field of view is enlarged. Moreover, it is not favorable for correcting the image curvature since the arrangement of the surface shapes is not proper. Accordingly, it results in worse image quality.

SUMMARY

According to one aspect of the present disclosure, an image lens assembly includes, in order from an object side to an image side a first lens element, a second lens element, a third lens element, a fourth lens element and a fifth lens element. The first lens element has refractive power. The second lens element with positive refractive power has a convex image-side surface in a paraxial region thereof. The third lens element has positive refractive power. The fourth lens element with refractive power has a concave image-side surface in a paraxial region thereof, wherein an object-side surface and the image-side surface of the fourth lens element are aspheric. The fifth lens element with refractive power has a concave image-side surface in a paraxial region thereof, wherein the image-side surface of the fifth lens element has at least one convex shape in an off-axis region thereof, and an object-side surface and the image-side surface of the fifth lens element are aspheric. The image lens assembly has a total of five lens elements with refractive power, wherein each of the five lens elements of the image lens assembly is separated from each other. When an axial distance between an object-side surface of the first lens element and an image plane is TL, and a curvature radius of an image-side surface of the first lens element is R2, the following condition is satisfied:

$$TL/R2<3.0.$$

According to another aspect of the present disclosure, an image capturing device includes the image lens assembly according to the foregoing aspect and an image sensor, wherein the image sensor is located on the image plane of the image lens assembly.

According to still another aspect of the present disclosure, an image lens assembly includes, in order from an object side to an image side, a first lens element, a second lens element, a third lens element, a fourth lens element and a fifth lens element. The first lens element has positive refractive power. The second lens element with positive refractive power has a convex image-side surface in a paraxial region thereof. The third lens element has positive refractive power. The fourth lens element with refractive power has a concave image-side surface in a paraxial region thereof, wherein an object-side surface and the image-side surface of the fourth lens element are aspheric. The fifth lens element with refractive power has a concave image-side surface in a paraxial region thereof, wherein the image-side surface of the fifth lens element has at least one convex shape in an off-axis region thereof, and an object-side surface and the image-side surface of the fifth lens element are aspheric. The image lens assembly has a total of five lens elements with refractive power, wherein each of the five lens elements of the image lens assembly is separated from each other.

BRIEF DESCRIPTION OF THE DRAWINGS

The disclosure can be more fully understood by reading the following detailed description of the embodiment, with reference made to the accompanying drawings as follows:

FIG. 19 shows Sag41 of the object-side surface of the fourth lens element according to the image lens assembly of FIG. 1.

DETAILED DESCRIPTION

Figure 1:
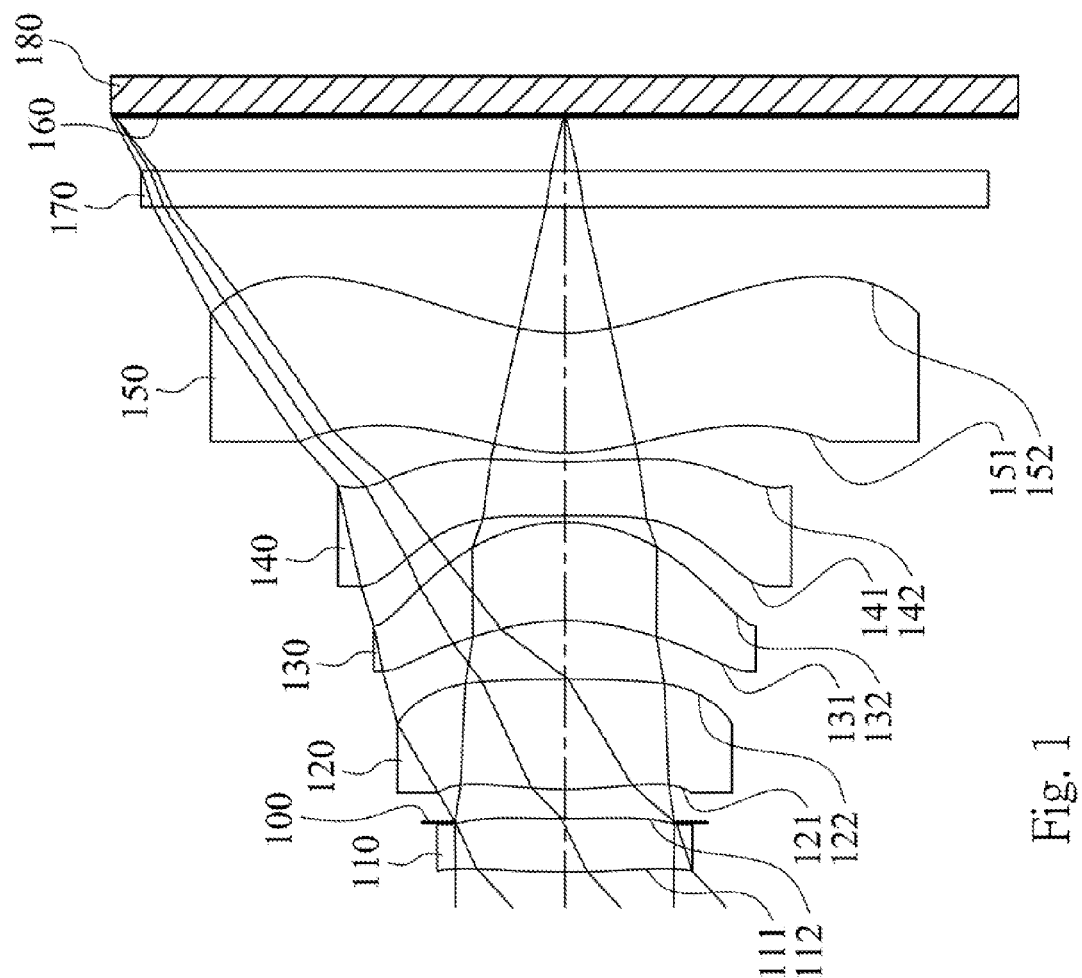
FIG. 1 is a schematic view of an image lens assembly according to the 1st embodiment of the present disclosure.

An image lens assembly includes five lens elements with refractive power, in order from an object side to an image side, a first lens element, a second lens element, a third lens element, a fourth lens element and a fifth lens element. The image lens assembly has a total of five lens elements with refractive power and further includes an image sensor located on an image plane.

Each of the first through fifth lens elements of the image lens assembly is a single and non-cemented lens element. That is, any two lens elements adjacent to each other are not cemented, and there is an axial space between any two lens elements of the five lens elements. Moreover, the manufacturing process of the cemented lenses is more complex than the non-cemented lenses. In particular, a second surface of one lens and a first surface of the following lens need to have accurate curvature to ensure these two lens elements will be highly cemented. However, during the cementing process, those two lens elements might not be highly cemented due to displacement and it is thereby not favorable for the image quality of the image lens assembly. Therefore, each of the five lens elements of the image lens assembly is separated from each other in the present disclosure for improving the problem generated by the cemented lens elements.

The first lens element can have positive refractive power and a convex object-side surface in a paraxial region thereof. Therefore, it is favorable for reducing the total track length of the image lens assembly by properly adjusting the positive refractive power of the first lens element.

The second lens element with positive refractive power has a convex image-side surface in a paraxial region thereof. Therefore, it is favorable for balancing the main refractive power of the image lens assembly so as to reduce the photosensitivity.

The third lens element with positive refractive power can have a concave object-side surface in a paraxial region thereof and a convex image-side surface in a paraxial region thereof. Therefore, it is favorable for effectively enlarging the field of view of the image lens assembly together with the positive refractive power of the second lens element.

The fourth lens element can have negative refractive power and has a concave image-side surface in a paraxial region thereof, wherein the image-side surface of the fourth lens element has at least one convex shape in an off-axis region thereof. Therefore, it is favorable for effectively correcting the aberration and reducing the incident angle of the off-axis on the image plane so as to increase the responding efficiency of an image sensor.

The fifth lens element can have positive refractive power, a convex object-side surface in a paraxial region thereof and a concave image-side surface in a paraxial region thereof, wherein the image-side surface of the fifth lens element has at least one convex shape in an off-axis region thereof. Therefore, it is favorable for effectively correcting the image distortion under the enlarged field of view. Moreover, it is favorable for the principal point being positioned away from the image plane so as to reduce the back focal length and keep the image lens assembly compact. It is also favorable for effectively correcting the aberration of the off-axis.

When an axial distance between an object-side surface of the first lens element and the image plane is TL, and a curvature radius of an image-side surface of the first lens element is R2, the following condition is satisfied: TL/R2>3.0. Therefore, it is favorable for maintaining a compact size of the image lens assembly and enlarging the field of view thereof. Preferably, the following condition is satisfied: −1.0<TL/R2<2.0.

When the axial distance between the object-side surface of the first lens element and the image plane is TL, and a maximum image height of the image lens assembly (half of a diagonal length of an effective photosensitive area of the image sensor) is ImgH, the following condition is satisfied: TL/ImgH<2.0. Therefore, it is favorable for maintaining a compact size of the image lens assembly so as to be applied to the portable and compact electronic products.

The aforementioned image lens assembly can further include a stop, such as an aperture stop, disposed between an imaged object and the second lens element, wherein an axial distance between the stop and the image plane is SL, and the axial distance between the object-side surface of the first lens element and the image plane is TL, the following condition is satisfied: 0.8<SL/TL<1.2. Therefore, it is favorable for making a good balance between the telecentricity and the wide-angle feature.

When an Abbe number of the second lens element is V2, and an Abbe number of the fourth lens element is V4, the following condition is satisfied: 1.5>V2/V4<3.0. Therefore, the chromatic aberration of the image lens assembly can be corrected.

When a curvature radius of the object-side surface of the second lens element is R3, and a curvature radius of the image-side surface of the second lens element is R4, the following condition is satisfied: −1.0>(R3+R4)/(R3−R4)<0.5. Therefore, it is favorable for reducing the spherical aberration.

When a curvature radius of the image-side surface of the third lens element is R6, and a curvature radius of the object-side surface of the fourth lens element is R7, the following condition is satisfied: −6.0<(R6 R7)/(R6−R7)<0. Therefore, it is favorable for effectively correcting the astigmatism.

When a distance in parallel with an optical axis from an axial vertex on the object-side surface of the fourth lens element to a maximum effective diameter position on the object-side surface of the fourth lens element is SAG41, and a central thickness of the fourth lens element is CT4, the following condition is satisfied: 1.2<|Sag41|/CT4. Therefore, the surface shape of the lens elements will not be excessively curved which are favorable for manufacturing and molding the lens elements and keeping the arrangement of the lens elements more compact.

When a maximal field of view of the image lens assembly is FOV, the following condition is satisfied: 80 degrees<FOV<105 degrees. Therefore, it is favorable for enlarging the field of view so as to obtain more of the image scene.

When a focal length of the first lens element is f1, and a focal length of the second lens element is f2, the following condition is satisfied: |f2|f1|<1.25. Therefore, it is favorable for reducing the photosensitivity.

When an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and a focal length of the image lens assembly is f, the following condition is satisfied: (T12+T23+T34+T45)/f<0.35. Therefore, it is favorable for reducing the total track length of the image lens assembly by properly adjusting the axial distance between every lens element and maintaining a compact size thereof.

According to the image lens assembly of the present disclosure, the lens elements can be made of plastic or glass material. When the lens elements are made of glass material, the distribution of the refractive power of the image lens assembly can be more flexible to design. When the lens elements are made of plastic material, the manufacturing cost thereof can be reduced. Furthermore, surfaces of each lens element can be arranged to be aspheric, because the aspheric surface of the lens element is easy to form a shape other than spherical surface so as to have more controllable variables for eliminating the aberration thereof, and to further decrease the required number of the lens elements. Thus, the total track length of the image lens assembly can be effectively reduced.

According to the image lens assembly of the present disclosure, an aperture stop can be configured as a front stop or a middle stop. A front stop disposed between an imaged object and the first lens element can provide a longer distance between an exit pupil of the system and an image plane and which improves the image-sensing efficiency of the image sensor. A middle stop disposed between the first lens element and the image plane is favorable for enlarging the field of view of the system and thereby provides a wider field of view for the same.

According to the image lens assembly of the present disclosure, the image lens assembly can include at least one stop, such as an aperture stop, a glare stop or a field stop. Said glare stop or said field stop is for eliminating the stray light and thereby improving the image resolution thereof.

According to the image lens assembly of the present disclosure, when the lens element has a convex surface, it indicates that the surface is convex in a paraxial region thereof; and when the lens element has a concave surface, it indicates that the surface is concave in a paraxial region thereof. Particularly, the paraxial region thereof refers to the region of the surface where light rays travel close to an optical axis and an off-axis region thereof refers to the region of the surface where light rays travel away from the optical axis.

According to the image lens assembly of the present disclosure, the image lens assembly is featured with good correction ability and high image quality, and can be applied to 3D (three-dimensional) image capturing applications, in products such as digital cameras, mobile devices and tablets.

According to the present disclosure, an image capturing device is provided. The image capturing device includes the image lens assembly according to the aforementioned image lens assembly of the present disclosure, and an image sensor, wherein the image sensor is located on the image plane of the image lens assembly. Therefore, it is favorable for enlarging the field of view, correcting the image distortion and maintaining a compact size thereof.

According to the above description of the present disclosure, the following 1st-9th specific embodiments are provided for further explanation.

1st Embodiment

Figure 2:
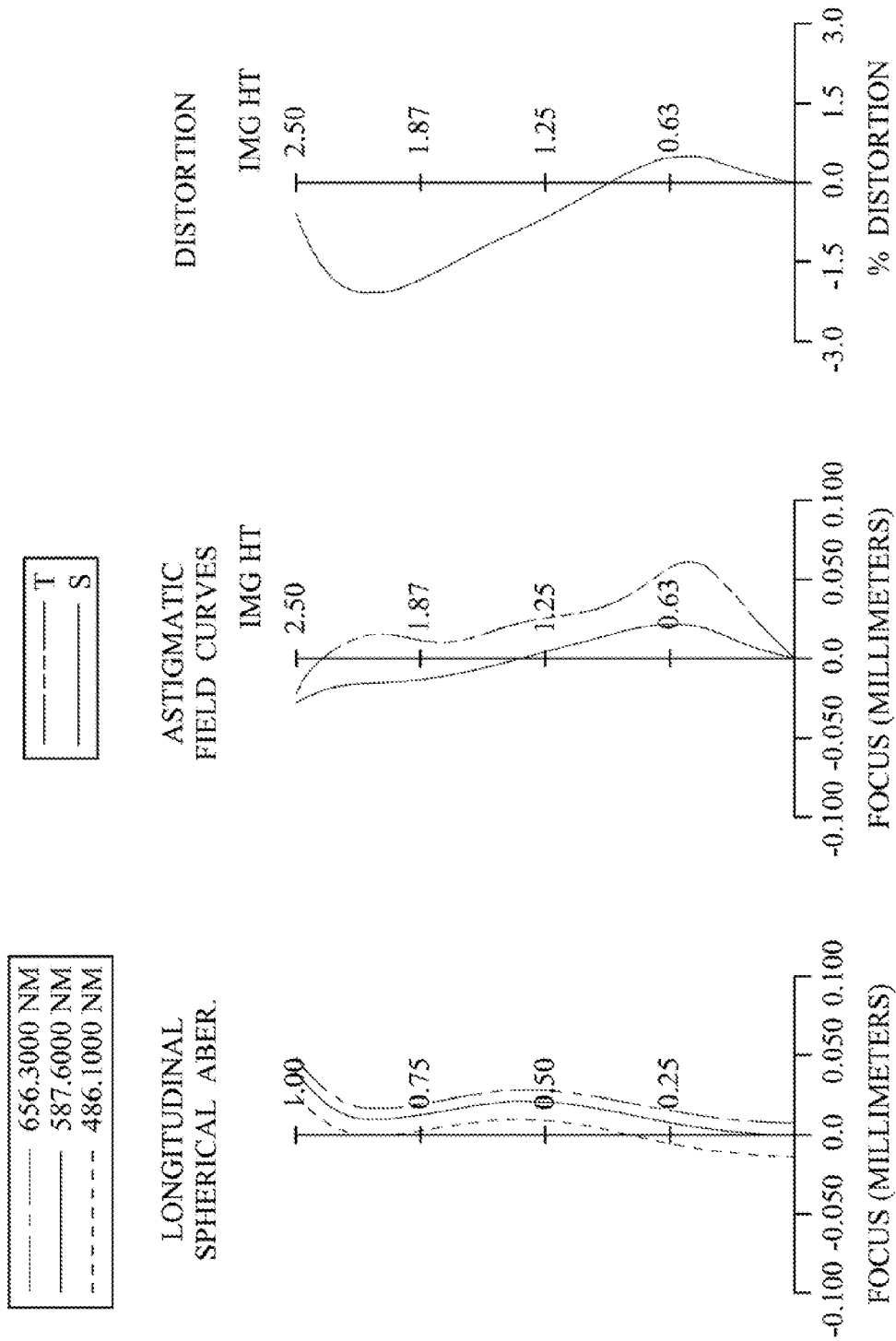
FIG. 2 shows spherical aberration curves, astigmatic field curves and a distortion curve of the image lens assembly according to the 1st embodiment.

FIG. 1 is a schematic view of an image lens assembly according to the 1st embodiment of the present disclosure. FIG. 2 shows spherical aberration curves, astigmatic field curves and a distortion curve of the image lens assembly according to the 1st embodiment. In FIG. 1, the image lens assembly includes five lens elements with refractive power, in order from an object side to an image side, a first lens element 110, an aperture stop 100, a second lens element 120, a third lens element 130, a fourth lens element 140, a fifth lens element 150, an IR-cut filter 170, an image plane 160 and an image sensor 180, wherein the image lens assembly has a total of five lens elements (110-150) with refractive power, and each of the five lens elements (110-150) is separated from each other.

The first lens element 110 with positive refractive power has a convex object-side surface 111 in a paraxial region thereof and a concave image-side surface 112 in a paraxial region thereof. The first lens element 110 is made of plastic material and has the object-side surface 111 and the image-side surface 112 being aspheric.

The second lens element 120 with positive refractive power has a convex object-side surface 121 in a paraxial region thereof and a convex image-side surface 122 in a paraxial region thereof. The second lens element 120 is made of plastic material and has the object-side surface 121 and the image-side surface 122 being aspheric.

The third lens element 130 with positive refractive power has a concave object-side surface 131 in a paraxial region thereof and a convex image-side surface 132 in a paraxial region thereof. The third lens element 130 is made of plastic material and has the object-side surface 131 and the image-side surface 132 being aspheric.

The fourth lens element 140 with negative refractive power has a convex object-side surface 141 in a paraxial region thereof and a concave image-side surface 142 in a paraxial region thereof, wherein the image-side surface 142 of the fourth lens element 140 has at least one convex shape in an off-axis region thereof. The fourth lens element 140 is made of plastic material and has the object-side surface 141 and the image-side surface 142 being aspheric.

The fifth lens element 150 with positive refractive power has a convex object-side surface 151 in a paraxial region thereof and a concave image-side surface 152 in a paraxial region thereof, wherein the image-side surface 152 of the fifth lens element 150 has at least one convex shape in an off-axis region thereof. The fifth lens element 150 is made of plastic material and has the object-side surface 151 and the image-side surface 152 being aspheric.

The IR-cut filter 170 is made of glass material located between the fifth lens element 150 and the image plane 160, and will not affect the focal length of the image lens assembly. The image lens assembly further includes an image sensor 180 located on the image plane 160.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

wherein,

X is the relative distance between a point on the aspheric surface spaced at a distance Y from the optical axis and the tangential plane at the aspheric surface vertex on the optical axis;

Y is the distance from the point on the curve of the aspheric surface the optical axis;

R is the curvature radius;

k is the conic coefficient; and

Ai is the i-th aspheric coefficient.

In the image lens assembly according to the 1st embodiment, when a focal length of the image lens assembly is f, an f-number of the image lens assembly is Fno, and half of the maximal field of view of the image lens assembly is HFOV, these parameters have the following values: f=2.73 mm; Fno=2.25; and HFOV=42.6 degrees.

In the image lens assembly according to the 1st embodiment, when an Abbe number of the second lens element 120 is V2, and an Abbe number of the fourth lens element 140 is V4, the following condition is satisfied: V2/V4=2.61.

In the image lens assembly according to the 1st embodiment, when an axial distance between the first lens element 110 and the second lens element 120 is T12, an axial distance between the second lens element 120 and the third lens element 130 is T23, an axial distance between the third lens element 130 and the fourth lens element 140 is T34, an axial distance between the fourth lens element 140 and the fifth lens element 150 is T45, and the focal length of the image lens assembly is f, the following condition is satisfied: (T12+T23+T34+T45)/f=0.21.

In the image lens assembly according to the 1st embodiment, the aperture stop 100 is disposed between an imaged object and the second lens element 120, wherein an axial distance between the aperture stop 100 and the image plane 160 is SL, an axial distance between the object-side surface 111 of the first lens element 110 and the image plane 160 is TL, and a curvature radius of an image-side surface 112 of the first lens element 110 is R2, the following conditions are satisfied: SL/TL=0.93; and TL/R2=0.46.

FIG. 19 shows Sag41 of the object-side surface 141 of the fourth lens element 140 of the image lens assembly according to FIG. 1. In FIG. 19, a distance in parallel with an optical axis from an axial vertex on the object-side surface 141 of the fourth lens element 140 to a maximum effective diameter position on the object-side surface 141 of the fourth lens element 140 is SAG41, and a central thickness of the fourth lens element 140 is CT4, the following condition is satisfied: |Sag41|/CT4=1.32.

In the image lens assembly according to the 1st embodiment, when a curvature radius of the object-side surface 121 of the second lens element 120 is R3, and a curvature radius of the image-side surface 122 of the second lens element 120 is R4 the following condition is satisfied: (R3+R4)/(R3−R4)=−0.59.

In the image lens assembly according to the 1st embodiment, when a curvature radius of the image-side surface 132 of the third lens element 130 is R6, and a curvature radius of the object-side surface 141 of the fourth lens element 140 is R7, the following condition is satisfied: (R6+R7)/(R6−R7)=−0.93.

In the image lens assembly according to the 1st embodiment, when a focal length of the first lens element 110 is f1, and a focal length of the second lens element 120 is f2, the following condition is satisfied: |f2/f1|=0.24.

In the image lens assembly according to the 1st embodiment, when a maximal field of view of the image lens assembly is FOV, the following condition is satisfied: FOV=85.2 degrees.

In the image lens assembly according to the 1st embodiment, when the axial distance between the object-side surface 111 of the first lens element 110 and the image plane 160 is TL, and a maximum image height of the image lens assembly (half of a diagonal length of an effective photosensitive area of the image sensor 180) is ImgH, the following condition is satisfied: TL/ImgH=1.68.

The detailed optical data of the 1st embodiment are shown in Table 1 and the aspheric surface data are shown in Table 2 below.

TABLE 1

1st Embodiment
f = 2.73 mm, Fno = 2.25, HFOV = 42.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 4.568 | ASP | 0.298 | Plastic | 1.572 | 55.0 | 15.70 |
| 2 | | 9.076 | ASP | −0.021 | | | | |
| 3 | Ape. Stop | Plano | | 0.184 | | | | |
| 4 | Lens 2 | 2.560 | ASP | 0.611 | Plastic | 1.544 | 55.9 | 3.81 |
| 5 | | −10.000 | ASP | 0.323 | | | | |
| 6 | Lens 3 | −1.273 | ASP | 0.550 | Plastic | 1.544 | 55.9 | 4.97 |
| 7 | | −0.998 | ASP | 0.035 | | | | |
| 8 | Lens 4 | 27.947 | ASP | 0.300 | Plastic | 1.650 | 21.4 | −5.12 |
| 9 | | 2.962 | ASP | 0.050 | | | | |
| 10 | Lens 5 | 1.256 | ASP | 0.667 | Plastic | 1.535 | 55.7 | 19.08 |
| 11 | | 1.167 | ASP | 0.700 | | | | |
| 12 | IR-cut filter | Plano | | 0.200 | Glass | 1.517 | 64.2 | — |
| 13 | | Plano | | 0.308 | | | | |
| 14 | Image | Plano | | — | | | | |

Note:
Reference wavelength is 587.6 nm (d-line).

TABLE 2

Aspheric Coefficients

| | Surface # | | | | |
|---|---|---|---|---|---|
| | 1 | 2 | 4 | 5 | 6 |
| k = | −3.8307E+01 | 1.0000E+00 | −3.3573E+00 | −3.0000E+01 | −6.3873E+00 |
| A4 = | −8.1595E−02 | −3.3171E−01 | −2.4973E−01 | −1.9603E−02 | 1.9484E−02 |
| A6 = | −1.0128E−01 | 1.1147E−03 | −2.5265E−01 | −2.9090E−01 | −8.3843E−02 |
| A8 = | 2.2728E−01 | −5.3702E−01 | 3.6524E−02 | −6.1478E−02 | −1.7170E−01 |
| A10 = | −1.1272E+00 | 1.8155E+00 | −8.9325E−01 | 4.7196E−02 | 1.4355E−01 |
| A12 = | 5.1239E−01 | −3.9189E+00 | 1.0872E+00 | 1.0681E−01 | 9.6947E−02 |
| A14 = | 2.2729E+00 | 2.6728E+00 | −2.5272E+00 | −1.0253E−01 | 5.0394E−02 |
| A16 = | −3.2354E+00 | 1.1871E+00 | 1.9630E+00 | −1.3549E−02 | −7.8123E−02 |

| | Surface # | | | | |
|---|---|---|---|---|---|
| | 7 | 8 | 9 | 10 | 11 |
| k = | −6.3562E−01 | −1.0000E+00 | −1.0000E+01 | −8.9810E+00 | −4.8060E+00 |
| A4 = | −1.2448E−01 | −4.9237E−01 | −4.0693E−01 | −3.8830E−01 | −4.3764E−02 |
| A6 = | 1.1929E−01 | −6.5247E−02 | 1.4512E−01 | −1.0491E−01 | −2.5254E−03 |
| A8 = | −1.2193E−02 | 1.5343E−01 | −2.7487E−03 | 9.6144E−02 | 3.2720E−03 |
| A10 = | −8.7244E−03 | 7.4669E−02 | 1.9818E−02 | −3.5469E−02 | −8.6888E−04 |
| A12 = | −7.5080E−03 | −5.1500E−03 | 3.9251E−03 | 4.8401E−03 | 5.4158E−05 |
| A14 = | −3.9236E−03 | −2.2189E−02 | −5.9128E−03 | | |
| A16 = | 4.1302E−02 | 5.4810E−04 | 3.3487E−04 | | |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

2nd Embodiment

Figure 3:
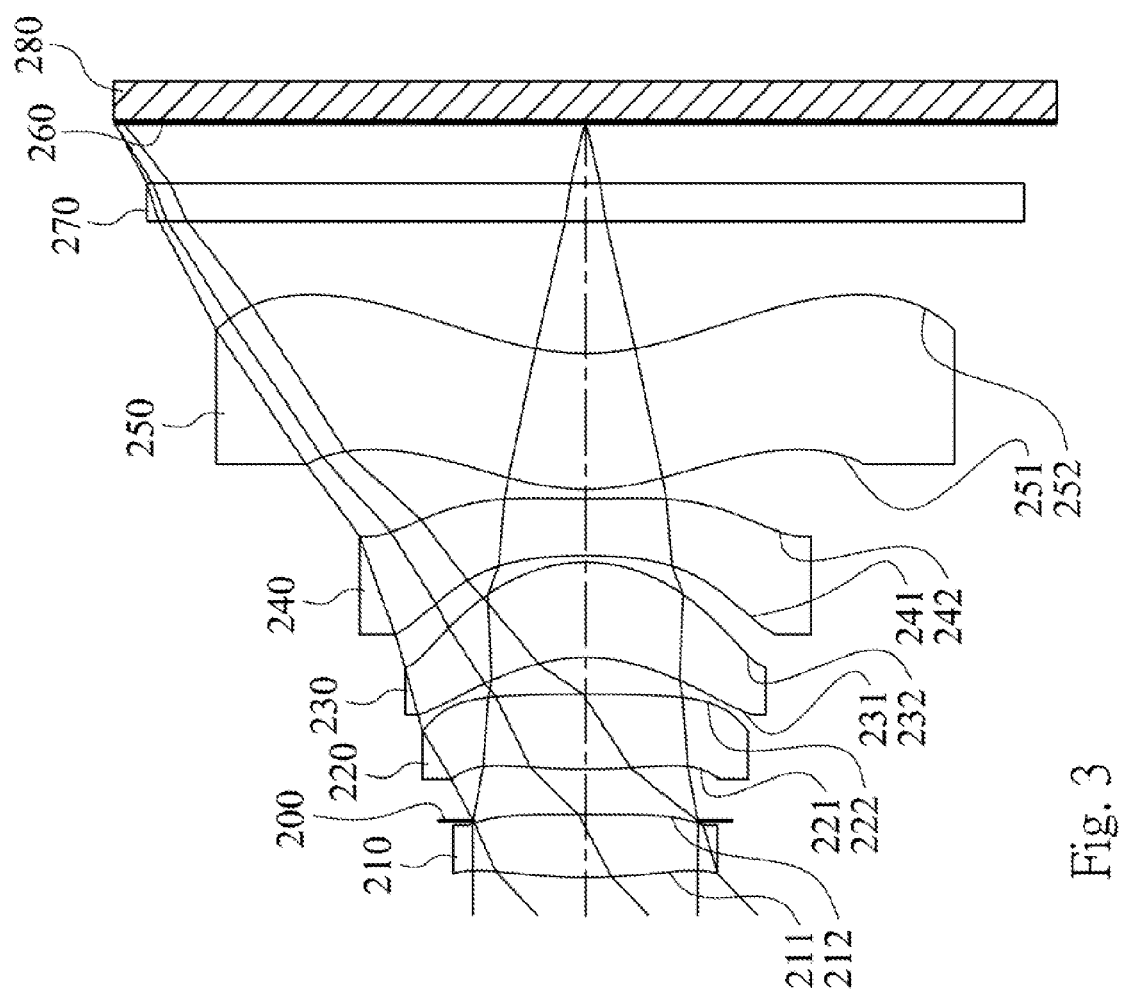
FIG. 3 is a schematic view of an image lens assembly according to the 2nd embodiment of the present disclosure.
Figure 4:
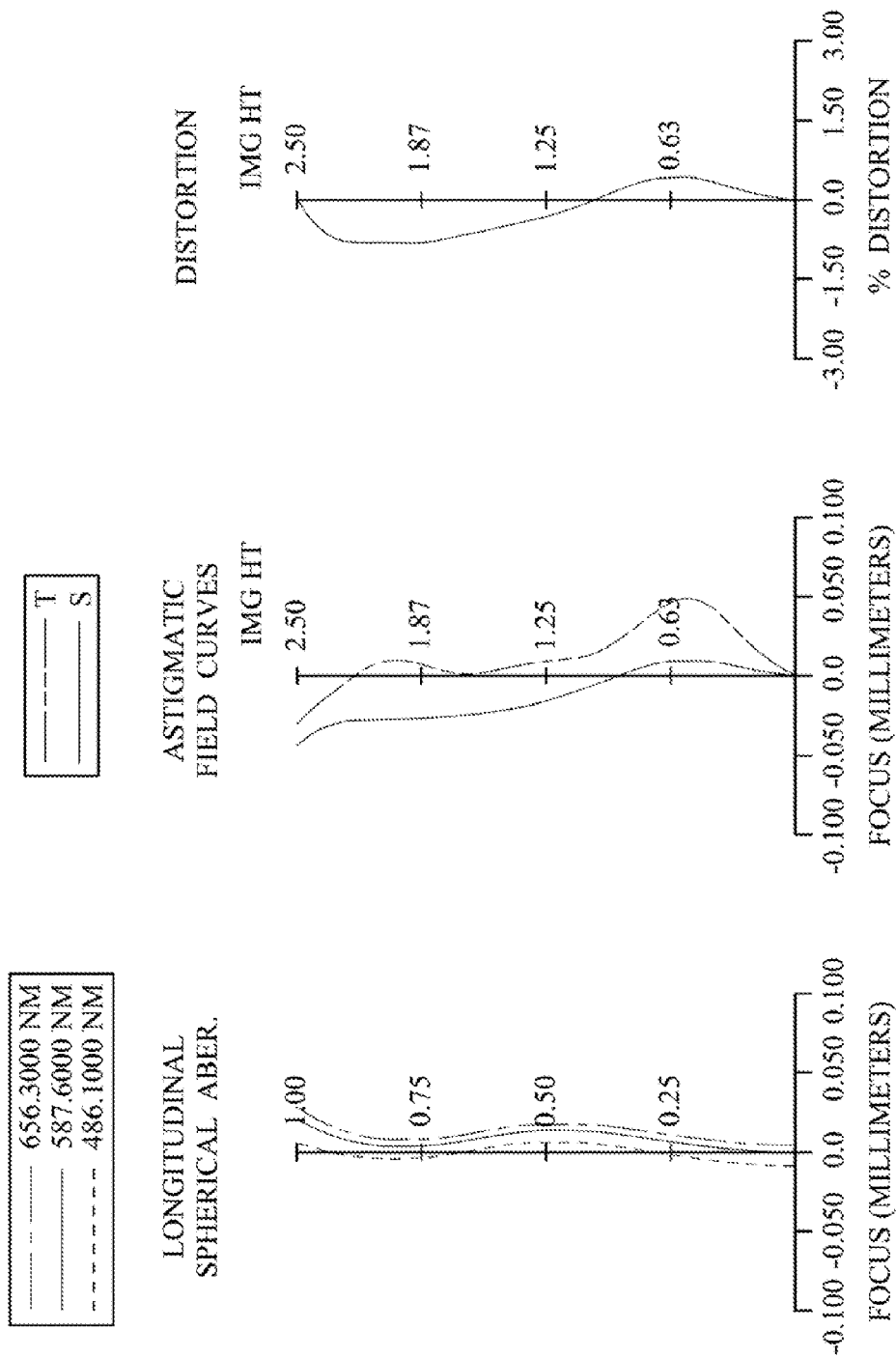
FIG. 4 shows spherical aberration curves, astigmatic field curves and a distortion curve of the image lens assembly according to the 2nd embodiment.

FIG. 3 is a schematic view of an image lens assembly according to the 2nd embodiment of the present disclosure. FIG. 4 shows spherical aberration curves, astigmatic field curves and a distortion curve of the image lens assembly according to the 2nd embodiment. In FIG. 3, the image lens assembly includes five lens elements with refractive power, in order from an object side to an image side, a first lens element 210, an aperture stop 200, a second lens element 220, a third lens element 230, a fourth lens element 240, a fifth lens element 250, an IR-cut filter 270, an image plane 260 and an image sensor 280, wherein the image lens assembly has a total of five lens elements (210-250) with refractive power, and each of the five lens elements (210-250) is separated from each other.

The first lens element 210 with positive refractive power has a convex object-side surface 211 in a paraxial region thereof and a concave image-side surface 212 in a paraxial region thereof. The first lens element 210 is made of plastic material and has the object-side surface 211 and the image-side surface 212 being aspheric.

The second lens element 220 with positive refractive power has a convex object-side surface 221 in a paraxial region thereof and a convex image-side surface 222 in a paraxial region thereof. The second lens element 220 is made of plastic material and has the object-side surface 221 and the image-side surface 222 being aspheric.

The third lens element 230 with positive refractive power has a concave object-side surface 231 in a paraxial region thereof and a convex image-side surface 232 in a paraxial region thereof. The third lens element 230 is made of plastic material and has the object-side surface 231 and the image-side surface 232 being aspheric.

The fourth lens element 240 with negative refractive power has a concave object-side surface 241 in a paraxial region thereof and a concave image-side surface 242 in a paraxial region thereof, wherein the image-side surface 242 of the fourth lens element 240 has at least one convex shape in an off-axis region thereof. The fourth lens element 240 is made of plastic material and has the object-side surface 241 and the image-side surface 242 being aspheric.

The fifth lens element 250 with positive refractive power has a convex object-side surface 251 in a paraxial region thereof and a concave image-side surface 252 in a paraxial region thereof, wherein the image-side surface 252 of the fifth lens element 250 has at least one convex shape in an off-axis region thereof. The fifth lens element 250 is made of plastic material and has the object-side surface 251 and the image-side surface 252 being aspheric.

The IR-cut filter 270 is made of glass material located between the fifth lens element 250 and the image plane 260, and will not affect the focal length of the image lens assembly. The image lens assembly further includes an image sensor 280 located on the image plane 260.

The detailed optical data of the 2nd embodiment are shown in Table 3 and the aspheric surface data are shown in Table 4 below.

TABLE 3

2nd Embodiment
f = 2.62 mm, Fno = 2.20, HFOV = 43.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.854 | ASP | 0.334 | Plastic | 1.544 | 55.9 | 5.26 |
| 2 | | 1079.232 | ASP | −0.035 | | | | |
| 3 | Ape. Stop | Plano | | 0.271 | | | | |
| 4 | Lens 2 | 3.254 | ASP | 0.402 | Plastic | 1.544 | 55.9 | 4.56 |
| 5 | | −10.000 | ASP | 0.195 | | | | |
| 6 | Lens 3 | −0.885 | ASP | 0.505 | Plastic | 1.544 | 55.9 | 5.86 |
| 7 | | −0.832 | ASP | 0.035 | | | | |
| 8 | Lens 4 | −2.889 | ASP | 0.300 | Plastic | 1.640 | 23.3 | −3.47 |
| 9 | | 10.000 | ASP | 0.050 | | | | |
| 10 | Lens 5 | 1.140 | ASP | 0.724 | Plastic | 1.544 | 55.9 | 5.73 |
| 11 | | 1.395 | ASP | 0.700 | | | | |
| 12 | IR-cut filter | Plano | | 0.200 | Glass | 1.517 | 64.2 | — |
| 13 | | Plano | | 0.325 | | | | |
| 14 | Image | Plano | | — | | | | |

Note:
Reference wavelength is 587.6 nm (d-line).

TABLE 4

Aspheric Coefficients

| | Surface # | | | | |
|---|---|---|---|---|---|
| | 1 | 2 | 4 | 5 | 6 |
| k = | −7.2632E+00 | 1.0000E+00 | 1.5598E+00 | 5.0000E+00 | −3.6515E+00 |
| A4 = | −9.2262E−02 | −2.7512E−01 | −2.1548E−01 | 3.4078E−02 | −5.2746E−02 |
| A6 = | −2.4628E−01 | −3.6065E−01 | −4.0370E−01 | −2.9418E−01 | 2.7298E−02 |
| A8 = | 5.4802E−01 | 3.5946E−01 | −2.4829E−02 | −2.4490E−01 | −1.0722E−01 |
| A10 = | −1.6062E+00 | 3.7415E−01 | −1.2894E+00 | −2.5981E−02 | 1.2856E−01 |
| A12 = | −3.5560E+00 | −3.4914E+00 | 3.1720E−01 | 2.8358E−01 | 9.4731E−02 |
| A14 = | 1.5332E+01 | 4.1866E+00 | 3.0033E+00 | 7.9503E−02 | 1.0074E−01 |
| A16 = | −1.4629E+01 | 1.1871E+00 | −2.4468E+00 | −3.6641E−01 | −1.2094E−01 |

| | Surface # | | | | |
|---|---|---|---|---|---|
| | 7 | 8 | 9 | 10 | 11 |
| k = | −6.8020E−01 | −1.0000E+00 | −1.0000E+01 | −6.0111E+00 | −1.8915E+00 |
| A4 = | −1.0190E−01 | −4.1959E−01 | −3.8416E−01 | −2.2642E−02 | −1.0441E−01 |
| A6 = | 1.0476E−01 | −5.9795E−02 | 1.3681E−01 | −1.0449E−01 | 1.8761E−02 |
| A8 = | −4.7345E−02 | 1.5162E−01 | 2.1735E−02 | 8.5306E−02 | −4.7376E−04 |
| A10 = | 1.9267E−02 | 9.8882E−02 | 1.6792E−02 | −2.9930E−02 | −6.1126E−04 |
| A12 = | 6.2094E−02 | 2.4694E−02 | 3.8128E−04 | 3.7528E−03 | 5.5069E−05 |
| A14 = | 6.3620E−02 | −1.1548E−02 | −6.2648E−03 | | |
| A16 = | 4.3798E−02 | −2.7770E−02 | −9.4264E−05 | | | in the image lens assembly according to the 2nd embodiment, the definitions of these parameters shown in the following table are the same as those stated in the 1st embodiment with corresponding values for the 2nd embodiment. Moreover, these parameters can be calculated from Table 3 and Table 4 as the following values and satisfy the following conditions:

| 2nd Embodiment | | | |
|---|---|---|---|
| f [mm] | 2.62 | |Sag41|/CT4 | 1.40 |
| Fno | 2.20 | (R3 + R4)/(R3 − R4) | −0.51 |
| HFOV [deg.] | 43.6 | (R6 + R7)/(R6 − R7) | −1.81 |
| V2/V4 | 2.40 | |f2/f1| | 0.87 |
| (T12 + T23 + T34 + T45)/f | 0.20 | FOV [deg.] | 87.2 |
| SL/TL | 0.93 | TL/ImgH | 1.60 |
| TL/R2 | 0.00 | | |

3rd Embodiment

Figure 5:
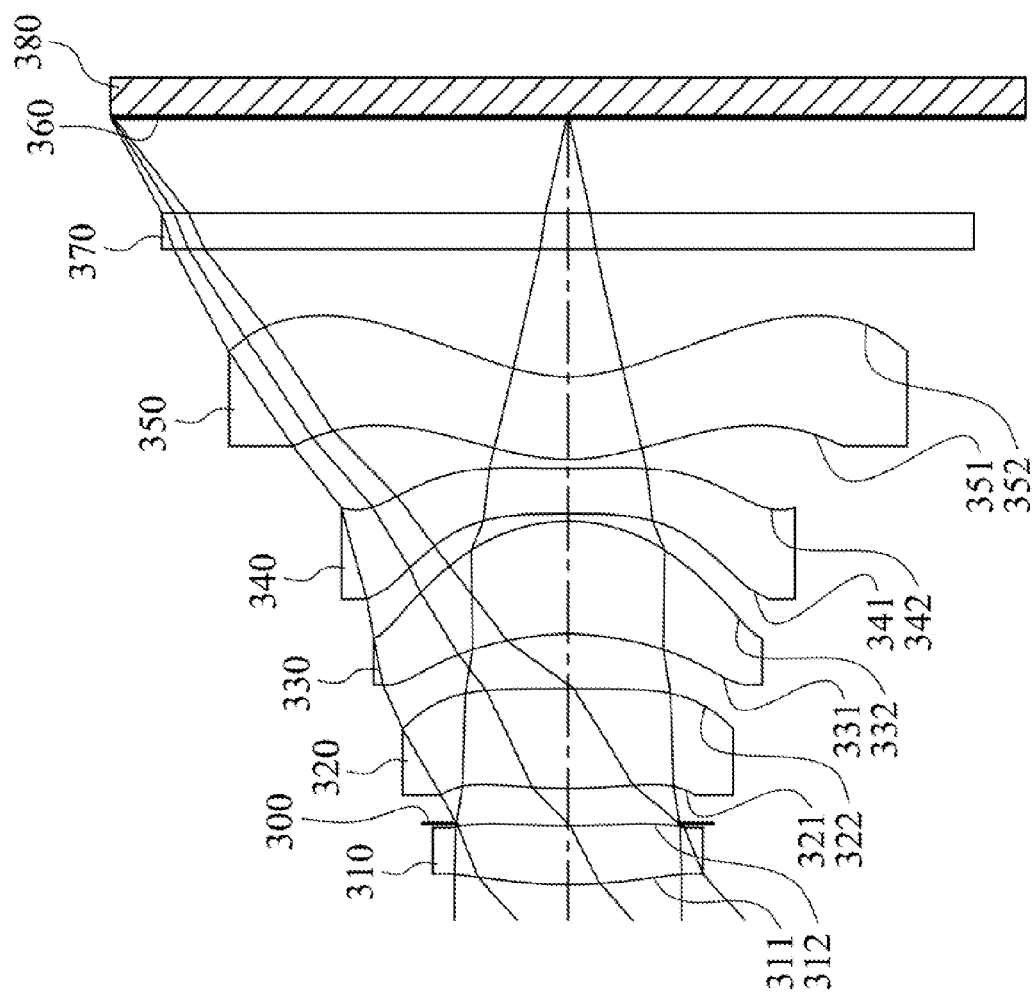
FIG. 5 is a schematic view of an mage lens assembly according to the 3rd embodiment of the present disclosure.
Figure 6:
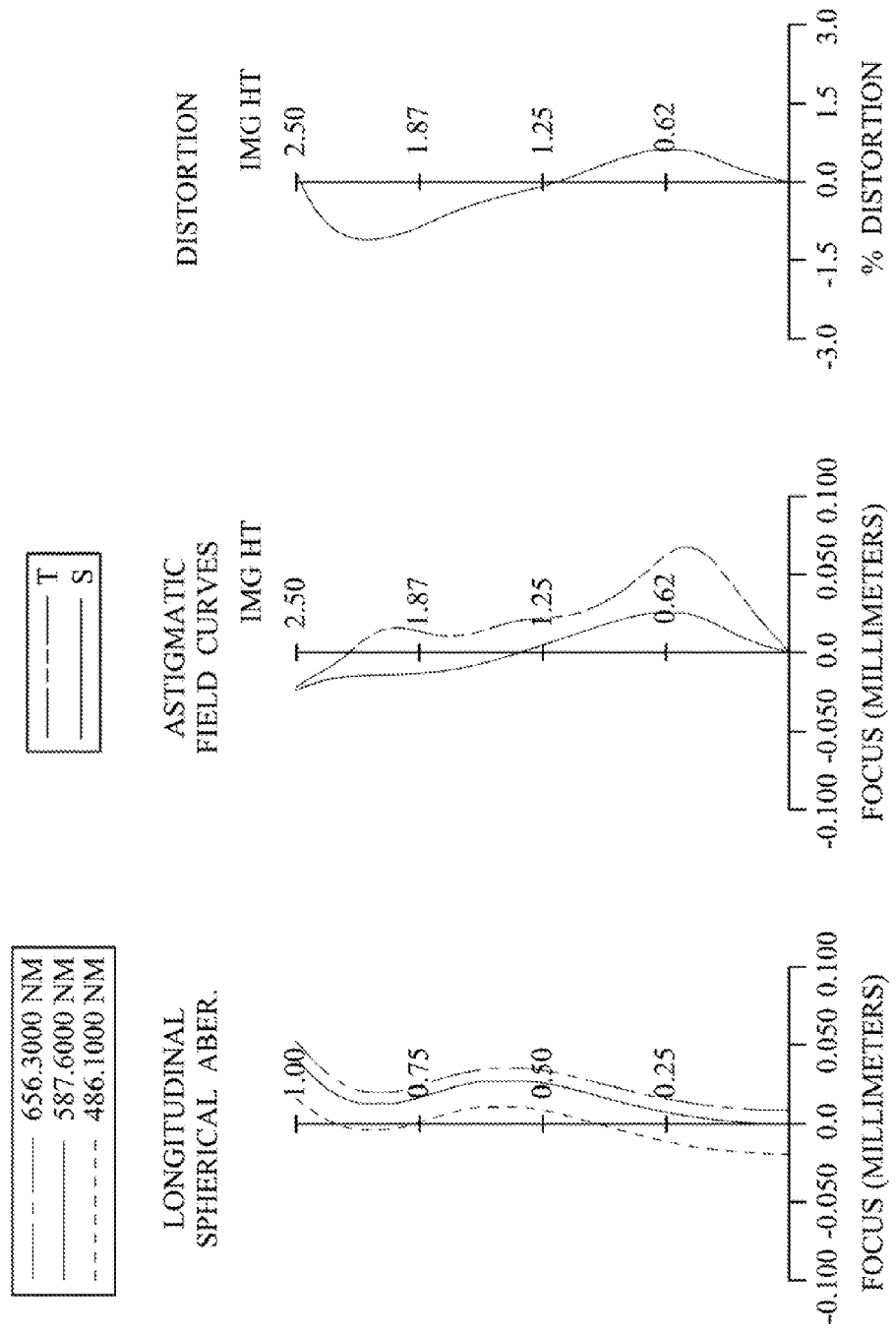
FIG. 6 shows spherical aberration curves, astigmatic field curves and a distortion curve of the image lens assembly according to the 3rd embodiment.

FIG. 5 is a schematic view of an image lens assembly according to the 3rd embodiment of the present disclosure. FIG. 6 shows spherical aberration curves, astigmatic field curves and a distortion curve of the image lens assembly according to the 3rd embodiment. In FIG. 5, the image lens assembly includes five lens elements with refractive power, in order from an object side to an image side, a first lens element 310, an aperture stop 300, a second lens element 320, a third lens element 330, a fourth lens element 340, a fifth lens element 350, an IR-cut filter 370, an image plane 360 and an image sensor 380, wherein the image lens assembly has a total of five lens elements (310-350) with refractive power, and each of the five lens elements (310-350) is separated from each other.

The first lens element 310 with positive refractive power has a convex object-side surface 311 in a paraxial region thereof and a concave image-side surface 312 in a paraxial region thereof. The first lens element 310 is made of plastic material and has the object-side surface 311 and the image-side surface 312 being aspheric.

The second lens element 320 with positive refractive power has a convex object-side surface 321 in a paraxial region thereof and a convex image-side surface 322 in a paraxial region thereof. The second lens element 320 is made of plastic material and has the object-side surface 321 and the image-side surface 322 being aspheric.

The third lens element 330 with positive refractive power has a concave object-side surface 331 in a paraxial region thereof and a convex image-side surface 332 in a paraxial region thereof. The third lens element 330 is made of plastic material and has the object-side surface 331 and the image-side surface 332 being aspheric.

The fourth lens element 340 with negative refractive power has a concave object-side surface 341 in a paraxial region thereof and a concave image-side surface 342 in a paraxial region thereof, wherein the image-side surface 342 of the fourth lens element 340 has at least one convex shape in an off-axis region thereof. The fourth lens element 340 is made of plastic material and has the object-side surface 341 and the image-side surface 342 being aspheric.

The fifth lens element 350 with negative refractive power has a convex object-side surface 351 in a paraxial region thereof and a concave image-side surface 352 in a paraxial region thereof, wherein the image-side surface 352 of the fifth lens element 350 has at least one convex shape in an off-axis region thereof. The fifth lens element 350 is made of plastic material and has the object-side surface 351 and the image-side surface 352 being aspheric.

The IR-cut filter 370 is made of glass material located between the fifth lens element 350 and the image plane 360, and will not affect the focal length of the image lens assembly. The image lens assembly further includes an image sensor 380 located on the image plane 360.

The detailed optical data of the 3rd embodiment are shown in Table 5 and the aspheric surface data are shown in Table 6 below.

TABLE 5

3rd Embodiment
f = 2.80 mm, Fno = 2.25, HFOV = 41.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.667 | ASP | 0.322 | Plastic | 1.544 | 55.9 | 10.52 |
| 2 | | 4.779 | ASP | 0.012 | | | | |
| 3 | Ape. Stop | Plano | | 0.193 | | | | |
| 4 | Lens 2 | 3.009 | ASP | 0.547 | Plastic | 1.544 | 55.9 | 4.89 |
| 5 | | −21.379 | ASP | 0.299 | | | | |
| 6 | Lens 3 | −1.466 | ASP | 0.620 | Plastic | 1.544 | 55.9 | 3.67 |
| 7 | | −0.971 | ASP | 0.040 | | | | |
| 8 | Lens 4 | −9.007 | ASP | 0.250 | Plastic | 1.640 | 23.3 | −6.52 |
| 9 | | 7.851 | ASP | 0.050 | | | | |
| 10 | Lens 5 | 1.118 | ASP | 0.450 | Plastic | 1.544 | 55.9 | −33.70 |
| 11 | | 0.905 | ASP | 0.700 | | | | |
| 12 | IR-cut filter | Plano | | 0.200 | Glass | 1.517 | 64.2 | — |
| 13 | | Plano | | 0.526 | | | | |
| 14 | Image | Plano | | — | | | | |

Note:
Reference wavelength is 587.6 nm (d-line).

TABLE 6

Aspheric Coefficients

| Surface # | 1 | 2 | 4 | 5 | 6 |
|---|---|---|---|---|---|
| k = | −2.0070E+00 | 1.0000E+00 | −3.4725E−01 | −3.0000E+01 | −8.9848E+00 |
| A4 = | −6.6728E−02 | −2.4405E−01 | −2.4018E−01 | −7.0324E−02 | −6.6362E−02 |
| A6 = | −1.0819E−01 | −1.2064E−01 | −4.6514E−01 | −3.6632E−01 | −7.4835E−02 |
| A8 = | 2.2883E−01 | −6.0253E−02 | 5.7935E−01 | 1.5624E−03 | −2.0564E−01 |
| A10 = | −4.8883E−02 | −4.7125E−01 | −1.6294E+00 | 4.3265E−02 | 1.2901E−01 |
| A12 = | −3.2977E+00 | 8.2626E−01 | −1.4550E+00 | 5.0513E−02 | 1.7518E−01 |
| A14 = | 7.3180E+00 | −9.4922E−01 | 2.2518E+00 | −1.0839E−01 | 1.6291E−01 |
| A16 = | −5.3229E+00 | 1.1871E+00 | 2.0205E+00 | 1.9135E−01 | −1.8267E−01 |

| Surface # | 7 | 8 | 9 | 10 | 11 |
|---|---|---|---|---|---|
| k = | −6.1951E−01 | −1.0000E+00 | −7.3002E+00 | −7.5388E+00 | −4.1235E+00 |
| A4 = | −1.7693E−01 | −5.5206E−01 | −3.9746E−01 | −5.7864E−03 | −5.6962E−02 |
| A6 = | 1.8397E−01 | −5.4258E−02 | 1.0931E−01 | −1.3181E−01 | −7.1836E−03 |
| A8 = | −3.0443E−02 | 1.9433E−01 | 7.0337E−01 | 9.0925E−02 | 6.6571E−03 |
| A10 = | −2.7022E−02 | 9.6628E−02 | 3.0605E−02 | −2.7113E−02 | −1.6761E−03 |
| A12 = | −9.9556E−03 | −2.7304E−03 | 9.7079E−03 | 3.0628E−03 | 1.1117E−04 |
| A14 = | −4.0313E−04 | −2.6847E−02 | −5.4642E−03 | | |
| A16 = | 4.0931E−02 | −1.1666E−02 | −2.9376E−03 | | |

In the image lens assembly according to the 3rd embodiment, the definitions of these parameters shown in the following table are the same as those stated in the 1st embodiment with corresponding values for the 3rd embodiment. Moreover, these parameters can be calculated from Table 5 and Table 6 as the following values and satisfy the following conditions:

| 3rd Embodiment | | | |
|---|---|---|---|
| f [mm] | 2.80 | |Sag41|/CT4 | 1.88 |
| Fno | 2.25 | (R3 + R4)/(R3 − R4) | −0.75 |
| HFOV [deg.] | 41.6 | (R6 + R7)/(R6 − R7) | −1.24 |
| V2/V4 | 2.40 | |f2/f1| | 0.46 |
| (T12 + T23 + T34 + T45)/f | 0.21 | FOV [deg.] | 83.2 |
| SL/TL | 0.92 | TL/ImgH | 1.68 |
| TL/R2 | 0.88 | | |

4th Embodiment

Figure 7:
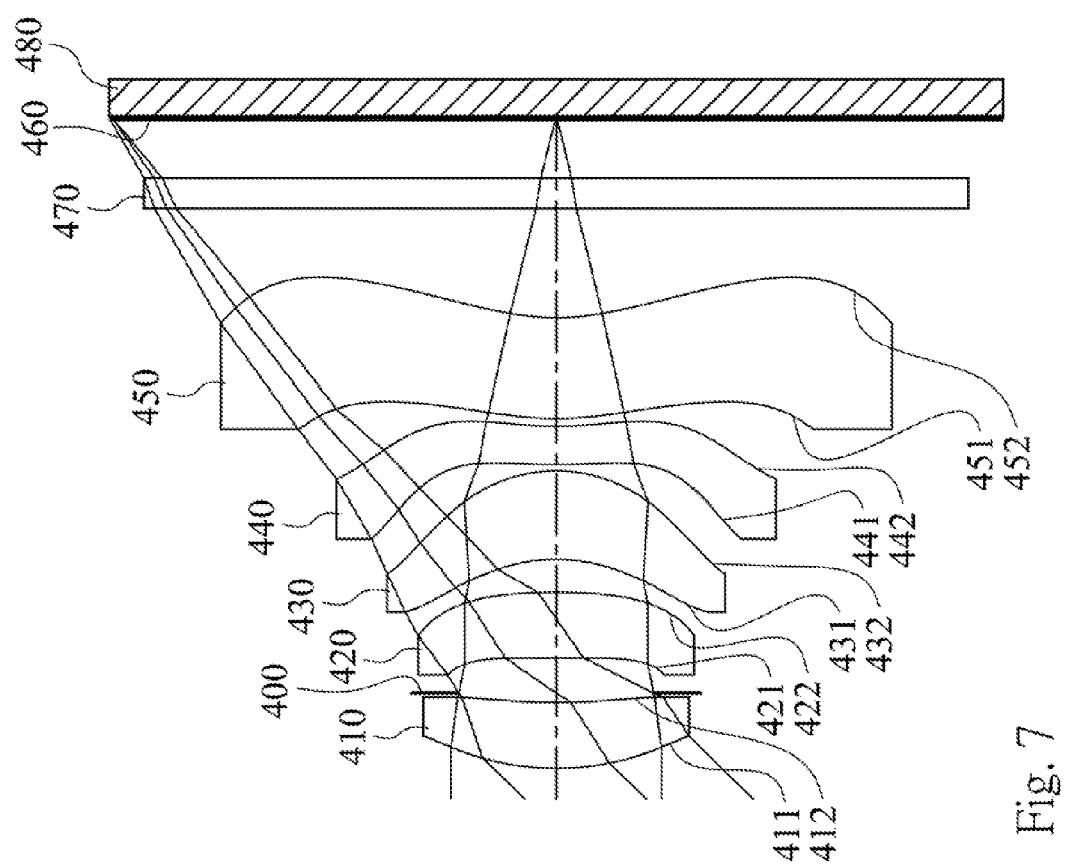
FIG. 7 is a schematic view of an image lens assembly according to the 4th embodiment of the present disclosure.
Figure 8:
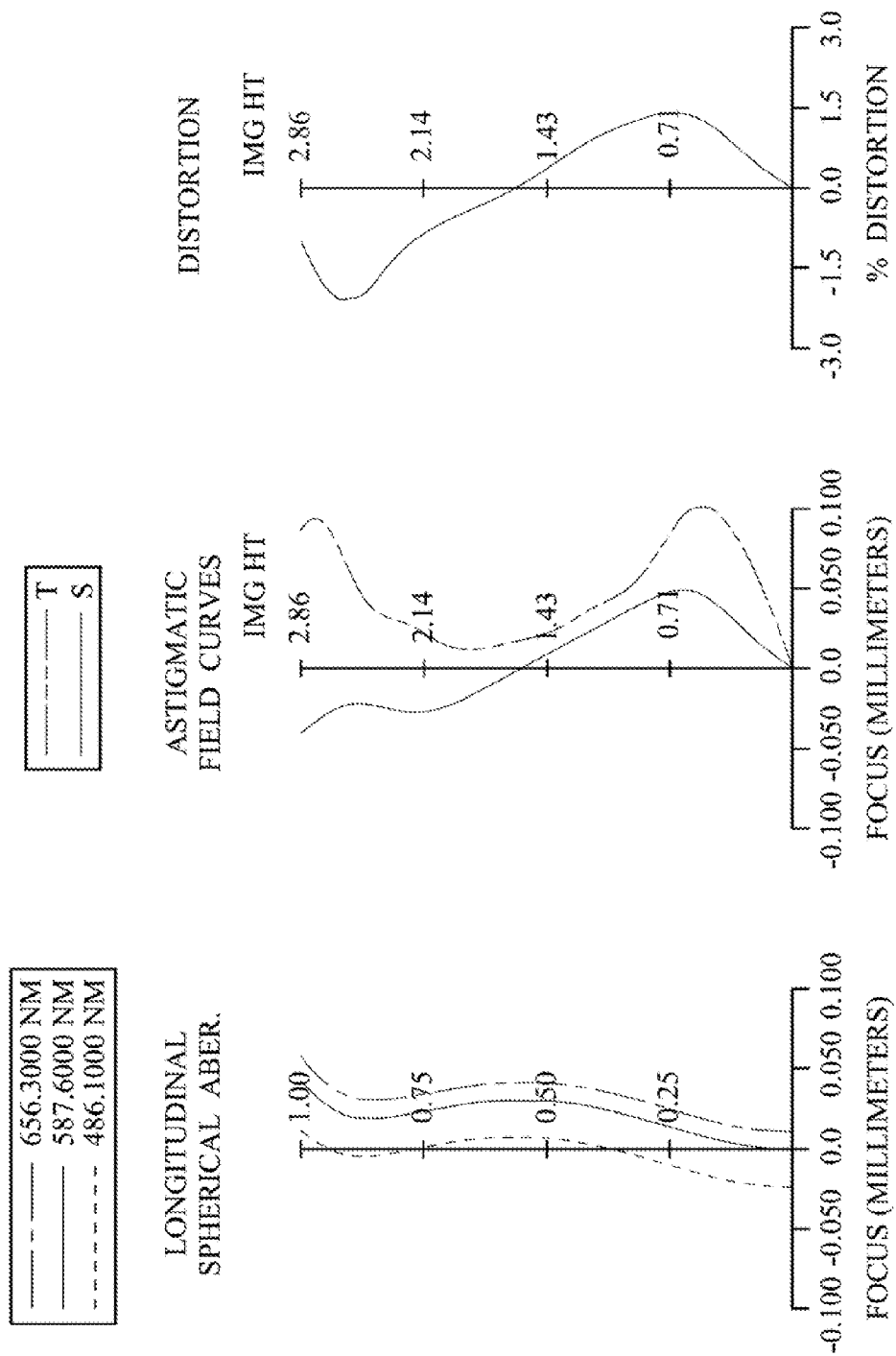
FIG. 8 shows spherical aberration curves, astigmatic field curves and a distortion curve of the image lens assembly according to the 4th embodiment.

FIG. 7 is a schematic view of an image lens assembly according to the 4th embodiment of the present disclosure. FIG. 8 shows spherical aberration curves, astigmatic field curves and a distortion curve of the image lens assembly according to the 4th embodiment. In FIG. 7, the image lens assembly includes five lens elements with refractive power, in order from an object side to an image side, a first lens element 410, an aperture stop 400, a second lens element 420, a third lens element 430, a fourth lens element 440, a fifth lens element 450, an IR-cut filter 470, an image plane 460 and an image sensor 480, wherein the image lens assembly has a total of five lens elements (410-450) with refractive power, and each of the five lens elements (410-450) is separated from each other.

The first lens element 410 with positive refractive power has a convex object-side surface 411 in a paraxial region thereof and a concave image-side surface 412 in a paraxial region thereof. The first lens element 410 is made of plastic material and has the object-side surface 411 and the image-side surface 412 being aspheric.

The second lens element 420 with positive refractive power has a concave object-side surface 421 in a paraxial region thereof and a convex image-side surface 422 in a paraxial region thereof. The second lens element 420 is made of plastic material and has the object-side surface 421 and the image-side surface 422 being aspheric.

The third lens element 430 with positive refractive power has a concave object-side surface 431 in a paraxial region thereof and a convex image-side surface 432 in a paraxial region thereof. The third lens element 430 is made of plastic material and has the object-side surface 431 and the image-side surface 432 being aspheric.

The fourth lens element 440 with negative refractive power has a convex object-side surface 441 in a paraxial region thereof and a concave image-side surface 442 in a paraxial region thereof, wherein the image-side surface 442 of the fourth lens element 440 has at least one convex shape in an off-axis region thereof. The fourth lens element 440 is made of plastic material and has the object-side surface 441 and the image-side surface 442 being aspheric.

The fifth lens element 450 with negative refractive power has a convex object-side surface 451 in a paraxial region thereof and a concave image-side surface 452 in a paraxial region thereof, wherein the image-side surface 452 of the fifth lens element 450 has at least one convex shape in an off-axis region thereof. The fifth lens element 450 is made of plastic material and has the object-side surface 451 and the image-side surface 452 being aspheric.

The IR-cut filter 470 is made of glass material located between the fifth lens element 450 and the image plane 460, and will not affect the focal length of the image lens assembly. The image lens assembly further includes an image sensor 480 located on the image plane 460.

The detailed optical data of the 4th embodiment are shown in Table 7 and the aspheric surface data are shown in Table 8 below.

TABLE 7

4th Embodiment
f = 2.78 mm, Fno = 2.05, HFOV = 45.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.741 | ASP | 0.421 | Plastic | 1.544 | 55.9 | 5.09 |
| 2 | | 4.289 | ASP | 0.064 | | | | |
| 3 | Ape. Stop | Plano | | 0.226 | | | | |
| 4 | Lens 2 | −100.000 | ASP | 0.421 | Plastic | 1.544 | 55.9 | 6.37 |
| 5 | | −3.353 | ASP | 0.214 | | | | |
| 6 | Lens 3 | −1.073 | ASP | 0.566 | Plastic | 1.544 | 55.9 | 6.47 |
| 7 | | −0.975 | ASP | 0.040 | | | | |
| 8 | Lens 4 | 3.395 | ASP | 0.250 | Plastic | 1.650 | 21.4 | −11.17 |
| 9 | | 2.246 | ASP | 0.050 | | | | |
| 10 | Lens 5 | 1.794 | ASP | 0.650 | Plastic | 1.544 | 55.9 | −69.52 |
| 11 | | 1.494 | ASP | 0.700 | | | | |
| 12 | IR-cut filter | Plano | | 0.200 | Glass | 1.517 | 64.2 | — |
| 13 | | Plano | | 0.385 | | | | |
| 14 | Image | Plano | | — | | | | |

Note:
Reference wavelength is 587.6 nm (d-line).

TABLE 8

Aspheric Coefficients

| Surface # | 1 | 2 | 4 | 5 | 6 |
|---|---|---|---|---|---|
| k = | 1.4057E+00 | 1.0000E+00 | 5.0000E+00 | 4.8792E+00 | −4.7710E+00 |
| A4 = | −1.2453E−02 | −1.7571E−02 | −1.9047E−01 | −1.2436E−01 | −2.3756E−01 |
| A6 = | −1.0115E−01 | −1.6632E−01 | −1.1820E−01 | −2.4196E−02 | 6.2088E−02 |
| A8 = | 1.3284E−01 | 2.7017E−01 | −2.9220E−01 | −8.5743E−02 | 1.0327E−01 |
| A10 = | −1.0293E−02 | −4.1066E−01 | −9.6033E−01 | −1.0020E−01 | 1.0180E−01 |
| A12 = | −5.1469E−01 | −1.4051E+00 | 1.0037E−02 | −4.7704E−02 | −1.9879E−03 |
| A14 = | 5.5733E−01 | 2.0628E+00 | −5.4145E−01 | −3.5335E−02 | −4.1652E−02 |
| A16 = | −2.9278E−01 | 1.6114E−01 | −3.0446E−01 | 1.7383E−01 | −3.3519E−02 |

| Surface # | 7 | 8 | 9 | 10 | 11 |
|---|---|---|---|---|---|
| k = | −5.6441E−01 | −1.0583E+00 | −9.9896E+00 | −3.0000E+01 | −9.0812E+00 |
| A4 = | −1.2439E−01 | −4.5249E−01 | −3.2854E−01 | 6.0667E−04 | −2.4515E−02 |
| A6 = | 9.8787E−02 | −5.1312E−02 | 7.3258E−02 | −5.8920E−02 | 4.0755E−03 |
| A8 = | −4.7375E−02 | 6.8902E−02 | −2.4828E−03 | 4.3110E−02 | −2.9122E−03 |
| A10 = | 3.0434E−02 | 1.6810E−02 | 6.9943E−03 | −14012E−02 | 1.1740E−03 |
| A12 = | 4.5274E−02 | −8.3579E−04 | 6.6793E−04 | 7.9368E−04 | −2.8432E−04 |
| A14 = | 1.1168E−02 | 9.2884E−04 | −1.3483E−03 | 2.4653E−04 | 2.5042E−05 |
| A16 = | −1.6032E−02 | −5.3484E−04 | 1.8982E−04 | | |

In the image lens assembly according to the 4th embodiment, the definitions of these parameters shown in the following table are the same as those stated in the 1st embodiment with corresponding values for the 4th embodiment. Moreover, these parameters can be calculated from Table 7 and Table 8 as the following values and satisfy the following conditions:

| 4th Embodiment | | | |
|---|---|---|---|
| f [mm] | 2.78 | |Sag41|/CT4 | 1.90 |
| Fno | 2.05 | (R3 + R4)/(R3 − R4) | 1.07 |
| HFOV [deg.] | 45.9 | (R6 + R7)/(R6 − R7) | −0.55 |
| V2/V4 | 2.61 | |f2/f1| | 1.25 |
| (T12 + T23 + T34 + T45)/f | 0.21 | FOV [deg.] | 91.8 |
| SL/TL | 0.88 | TL/ImgH | 1.47 |
| TL/R2 | 0.98 | | |

5th Embodiment

Figure 9:
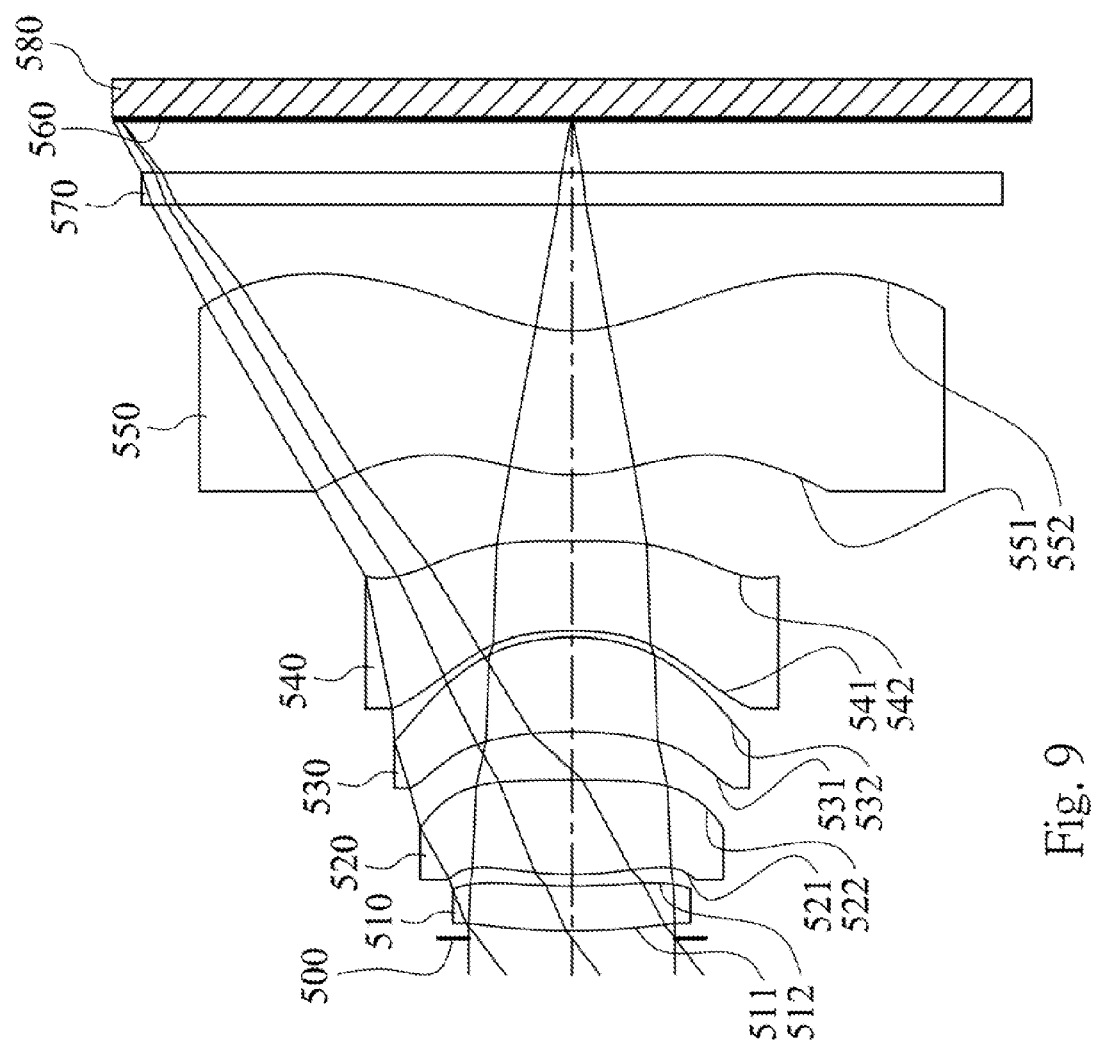
FIG. 9 is a schematic view of an image lens assembly according to the 5th embodiment of the present disclosure.
Figure 10:
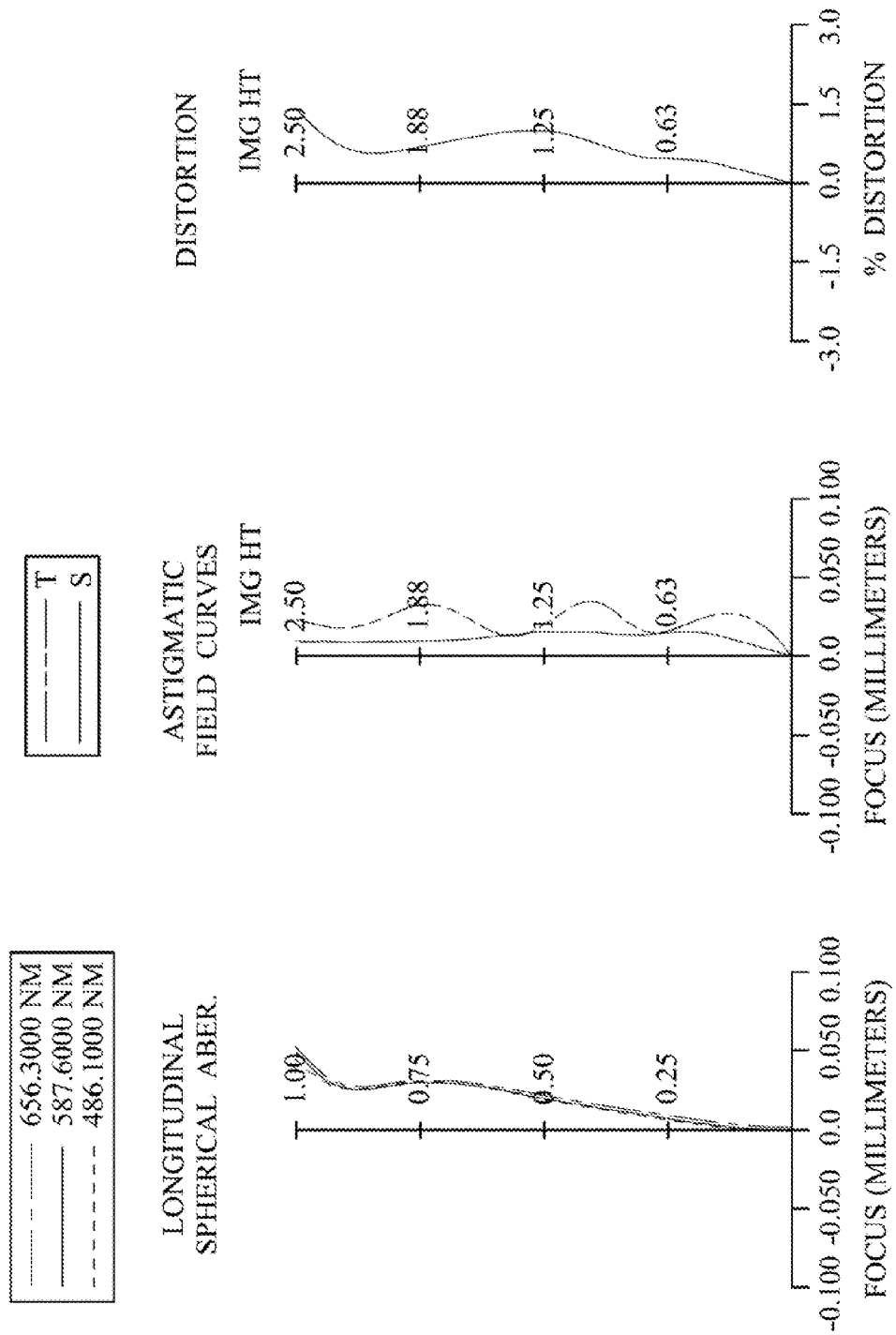
FIG. 10 shows spherical aberration curves, astigmatic field curves and a distortion curve of the image lens assembly according to the 5th embodiment.

FIG. 9 is a schematic view of an image lens assembly according to the 5th embodiment of the present disclosure. FIG. 10 shows spherical aberration curves, astigmatic field curves and a distortion curve of the image lens assembly according to the 5th embodiment. In FIG. 9, the image lens assembly includes five lens elements with refractive power, in order from an object side to an image side, an aperture stop 500, a first lens element 510, a second lens element 520, a third lens element 530, a fourth lens element 540, a fifth lens element 550, an IR-cut filter 570, an image plane 560 and an image sensor 580, wherein the image lens assembly has a total of five lens elements (510-550) with refractive power, and each of the five lens elements (510-550) is separated from each other.

The first lens element 510 with negative refractive power has a convex object-side surface 511 in a paraxial region thereof and a concave image-side surface 512 in a paraxial region thereof. The first lens element 510 is made of plastic material and has the object-side surface 511 and the image-side surface 512 being aspheric.

The second lens element 520 with positive refractive power has a convex object-side surface 521 in a paraxial region thereof and a convex image-side surface 522 in a paraxial region thereof. The second lens element 520 is made of plastic material and has the object-side surface 521 and the image-side surface 522 being aspheric.

The third lens element 530 with positive refractive power has a concave object-side surface 531 in a paraxial region thereof and a convex image-side surface 532 in a paraxial region thereof. The third lens element 530 is made of plastic material and has the object-side surface 531 and the image-side surface 532 being aspheric.

The fourth lens element 540 with negative refractive power has a concave object-side surface 541 in a paraxial region thereof and a concave image-side surface 542 in a paraxial region thereof, wherein the image-side surface 542 of the fourth lens element 540 has at least one convex shape in an off-axis region thereof. The fourth lens element 540 is made of plastic material and has the object-side surface 541 and the image-side surface 542 being aspheric.

The fifth lens element 550 with positive refractive power has a convex object-side surface 551 in a paraxial region thereof and a concave image-side surface 552 in a paraxial region thereof, wherein the image-side surface 552 of the fifth lens element 550 has at least one convex shape in an off-axis region thereof. The fifth lens element 550 is made of plastic material and has the object-side surface 551 and the image-side surface 552 being aspheric.

The IR-cut filter 570 is made of glass material located between the fifth lens element 550 and the image plane 560, and will not affect the focal length of the image lens assembly. The image lens assembly further includes an image sensor 580 located on the image plane 560.

The detailed optical data of the 5th embodiment are shown in Table 9 and the aspheric surface data are shown in Table 10 below.

TABLE 9

5th Embodiment
f = 3.14 mm, Fno = 2.75, HFOV = 38.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | 0.041 | | | | |
| 2 | Lens 1 | 3.513 | ASP | 0.250 | Plastic | 1.514 | 56.8 | −27.39 |
| 3 | | 2.743 | ASP | 0.064 | | | | |
| 4 | Lens 2 | 1.646 | ASP | 0.524 | Plastic | 1.544 | 55.9 | 2.80 |
| 5 | | −18.343 | ASP | 0.264 | | | | |
| 6 | Lens 3 | −2.352 | ASP | 0.524 | Plastic | 1.544 | 55.9 | 4.83 |
| 7 | | −1.338 | ASP | 0.035 | | | | |
| 8 | Lens 4 | −1.898 | ASP | 0.500 | Plastic | 1.634 | 23.8 | −2.86 |
| 9 | | 43.166 | ASP | 0.364 | | | | |
| 10 | Lens 5 | 0.963 | ASP | 0.800 | Plastic | 1.535 | 55.7 | 7.14 |
| 11 | | 0.914 | ASP | 0.700 | | | | |
| 12 | IR-cut filter | Plano | | 0.175 | Glass | 1.517 | 64.2 | — |
| 13 | | Plano | | 0.296 | | | | |
| 14 | Image | Plano | | — | | | | |

Note:
Reference wavelength is 587.6 nm (d-line).
The effective radius of surface 11 is 2.060 mm.

TABLE 10

Aspheric Coefficients

| Surface # | 2 | 3 | 4 | 5 | 6 |
|---|---|---|---|---|---|
| k = | −1.9744E+01 | 1.0000E+00 | −1.0606E+01 | 5.0000E+00 | −1.1071E+01 |
| A4 = | −1.3319E−02 | −6.2565E−01 | −3.6558E−01 | −2.2496E−01 | −9.1314E−02 |
| A6 = | 7.7052E−02 | 8.9863E−01 | 4.2900E−01 | −2.4436E−01 | −7.2535E−01 |
| A8 = | 1.1316E−01 | −8.6588E−01 | −2.9973E+00 | −1.2829E+00 | 1.8831E+00 |
| A10 = | −1.0945E+00 | −2.3577E+00 | 5.3213E+00 | 4.1390E+00 | −6.3241E+00 |
| A12 = | 3.0177E−01 | 1.3202E+00 | 1.2310E+00 | −6.9914E+00 | 1.0193E+01 |
| A14 = | 2.4812E+00 | 1.6101E+00 | −4.1837E+01 | 5.4657E+00 | −6.2867E+00 |
| A16 = | −1.7965E+00 | 6.5913E−01 | 4.8610E+01 | −1.1213E+00 | 1.1962E+00 |

| Surface # | 7 | 8 | 9 | 10 | 11 |
|---|---|---|---|---|---|
| k = | −5.7089E−02 | −3.9063E+01 | 5.0000E+01 | −5.5996E+00 | 4.0579E+00 |
| A4 = | −1.2634E−01 | −1.2213E+00 | −9.7878E−01 | −3.5374E−01 | −1.2033E−01 |
| A6 = | −2.8701E+00 | 4.8825E−01 | 2.0720E+00 | 1.5552E−01 | 4.9002E−02 |
| A8 = | 1.2397E+01 | 2.9774E+00 | −3.4089E+00 | −2.2538E−02 | −1.3650E−02 |
| A10 = | −2.4968E+01 | −4.7470E+00 | 4.1323E+00 | −2.4353E−03 | 2.0655E−03 |
| A12 = | 2.7939E+01 | 2.2076E+00 | −3.0582E+00 | 5.9276E−04 | −1.3512E−04 |
| A14 = | −1.6892E+01 | 4.4601E−01 | 1.2418E+00 | | |
| A16 = | 4.3733E+00 | −4.6115E−01 | −2.1395E−01 | | |

In the image lens assembly according to the 5th embodiment, the definitions of these parameters shown in the following table are the same as those stated in the 1st embodiment with corresponding values for the 5th embodiment. Moreover, these parameters can be calculated from Table 9 and Table 10 as the following values and satisfy the following conditions:

| 5th Embodiment | | | |
|---|---|---|---|
| f [mm] | 3.14 | |Sag41|/CT4 | 0.86 |
| Fno | 2.75 | (R3 + R4)/(R3 − R4) | −0.84 |
| HFOV [deg.] | 38.0 | (R6 + R7)/(R6 − R7) | −5.78 |
| V2/V4 | 2.35 | |f2/f1| | 0.10 |
| (T12 + T23 + T34 + T45)/f | 0.23 | FOV [deg.] | 76.0 |
| SL/TL | 1.01 | TL/ImgH | 1.80 |
| TL/R2 | 1.64 | | |

6th Embodiment

Figure 11:
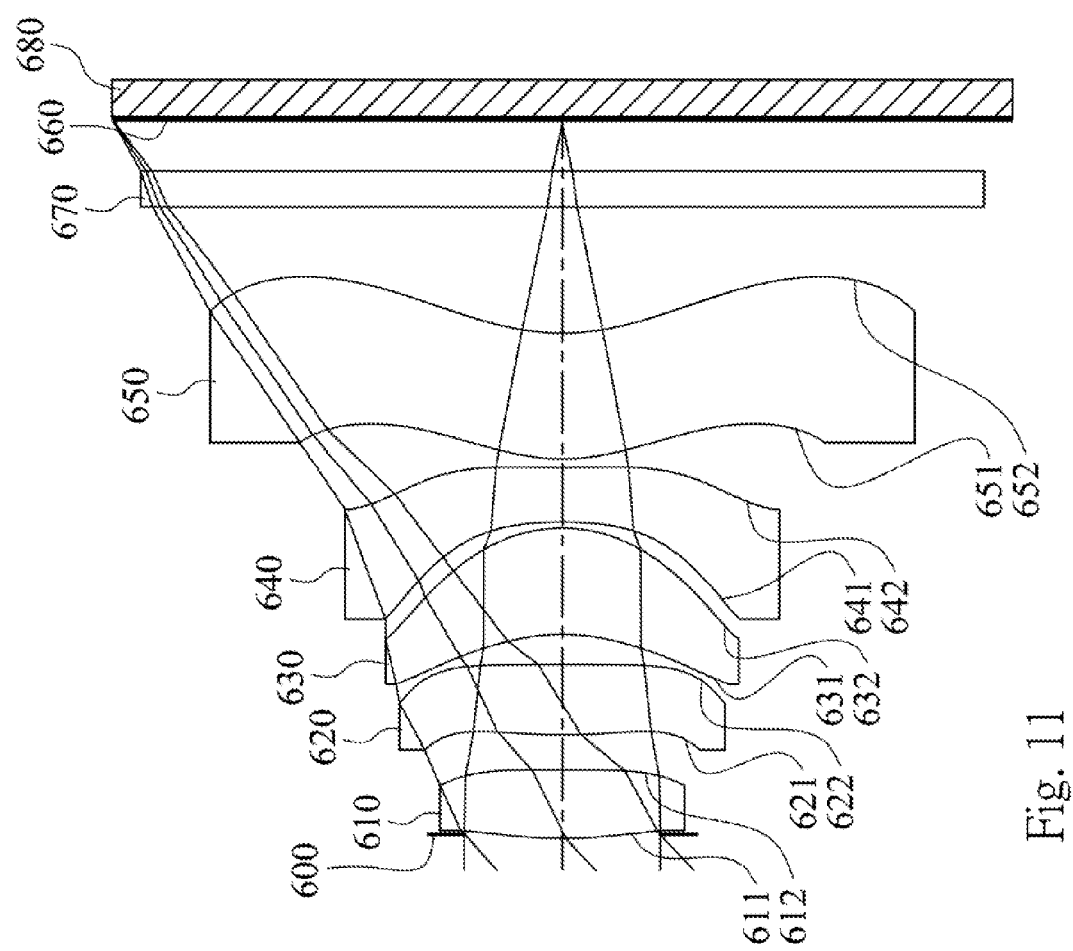
FIG. 11 is a schematic view of an image lens assembly according to the 6th embodiment of the present disclosure.
Figure 12:
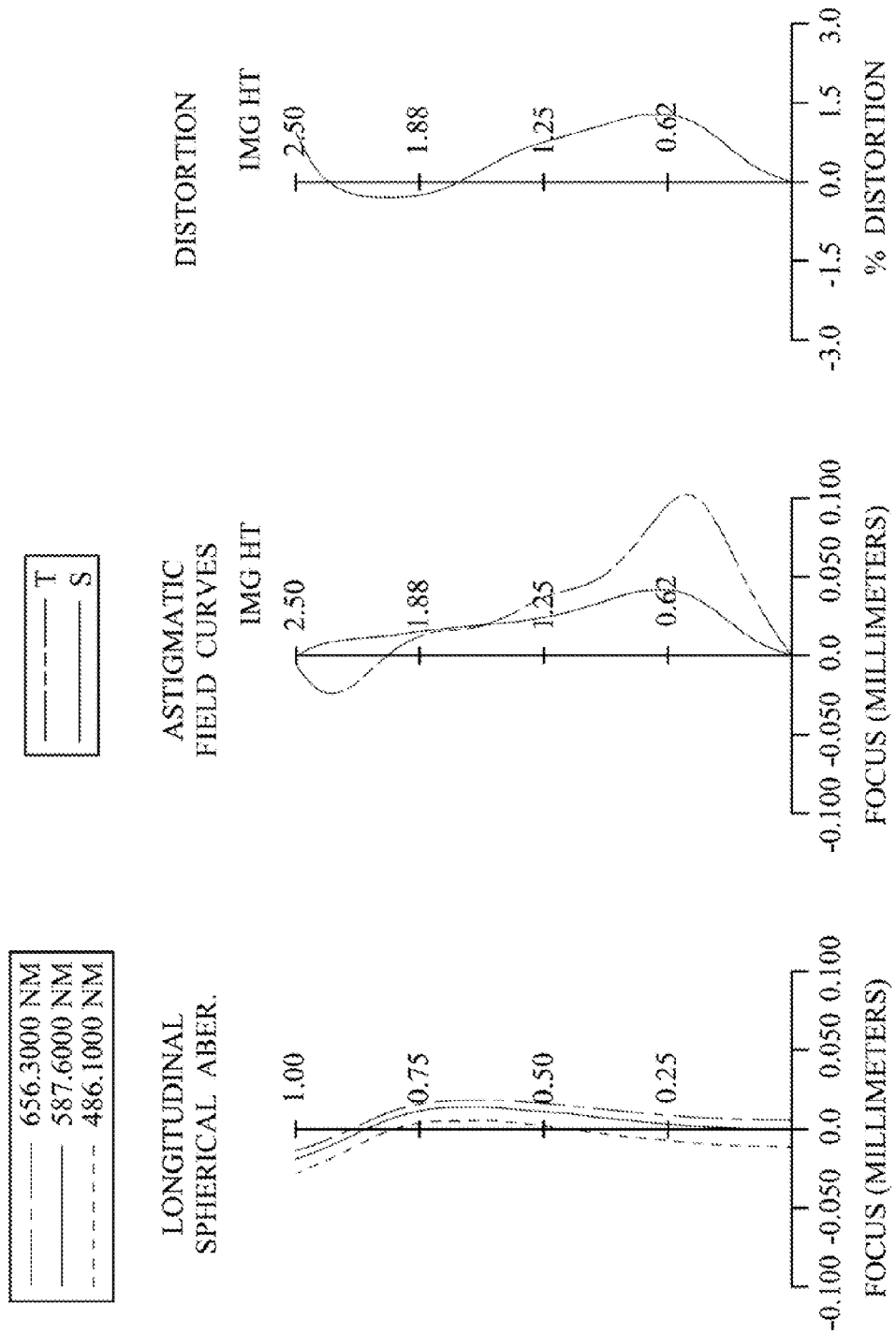
FIG. 12 shows spherical aberration curves, astigmatic field curves and a distortion curve of the image lens assembly according to the 6th embodiment.

FIG. 11 is a schematic view of an image lens assembly according to the 6th embodiment of the present disclosure. FIG. 12 shows spherical aberration curves, astigmatic field curves and a distortion curve of the image lens assembly according to the 6th embodiment. In FIG. 11, the image lens assembly includes five lens elements with refractive power, in order from an object side to an image side, an aperture stop 600, a first lens element 610, a second lens element 620, a third lens element 630, a fourth lens element 640, a fifth lens element 650, an IR-cut filter 670, an image plane 660 and an image sensor 680, wherein the image lens assembly has a total of five lens elements (610-650) with refractive power, and each of the five lens elements (610-650) is separated from each other.

The first lens element 610 with positive refractive power has a convex object-side surface 611 in a paraxial region thereof and a convex image-side surface 612 in a paraxial region thereof. The first lens element 610 is made of plastic material and has the object-side surface 611 and the image-side surface 612 being aspheric.

The second lens element 620 with positive refractive power has a convex object-side surface 621 in a paraxial region thereof and a convex image-side surface 622 in a paraxial region thereof. The second lens element 620 is made of plastic material and has the object-side surface 621 and the image-side surface 622 being aspheric.

The third lens element 630 with positive refractive power has a concave object-side surface 631 in a paraxial region thereof and a convex image-side surface 632 in a paraxial region thereof. The third lens element 630 is made of plastic material and has the object-side surface 631 and the image-side surface 632 being aspheric.

The fourth lens element 640 with negative refractive power has a concave object-side surface 641 in a paraxial region thereof and a concave image-side surface 642 in a paraxial region thereof, wherein the image-side surface 642 of the fourth lens element 640 has at least one convex shape in an off-axis region thereof. The fourth lens element 640 is made of plastic material and has the object-side surface 641 and the image-side surface 642 being aspheric.

The fifth lens element 650 with positive refractive power has a convex object-side surface 651 in a paraxial region thereof and a concave image-side surface 652 in a paraxial region thereof, wherein the image-side surface 652 of the fifth lens element 650 has at least one convex shape in an off-axis region thereof. The fifth lens element 650 is made of plastic material and has the object-side surface 651 and the image-side surface 652 being aspheric.

The IR-cut filter 670 is made of glass material located between the fifth lens element 650 and the image plane 660, and will not affect the focal length of the image lens assembly. The image lens assembly further includes an image sensor 680 located on the image plane 660.

The detailed optical data of the 6th embodiment are shown in Table 11 and the aspheric surface data are shown in Table 12 below.

TABLE 11

6th Embodiment
f = 2.67 mm, Fno = 2.45, HFOV = 42.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.022 | | | | |
| 2 | Lens 1 | 2.665 | ASP | 0.381 | Plastic | 1.544 | 55.9 | 4.72 |
| 3 | | −67.371 | ASP | 0.191 | | | | |
| 4 | Lens 2 | 3.189 | ASP | 0.394 | Plastic | 1.544 | 55.9 | 5.13 |
| 5 | | −21.350 | ASP | 0.168 | | | | |
| 6 | Lens 3 | −1.103 | ASP | 0.590 | Plastic | 1.544 | 55.9 | 3.81 |
| 7 | | −0.855 | ASP | 0.035 | | | | |
| 8 | Lens 4 | −2.030 | ASP | 0.300 | Plastic | 1.634 | 23.8 | −2.50 |
| 9 | | 7.595 | ASP | 0.050 | | | | |
| 10 | Lens 5 | 1.093 | ASP | 0.700 | Plastic | 1.583 | 30.2 | 5.27 |
| 11 | | 1.296 | ASP | 0.700 | | | | |
| 12 | IR-cut filter | Plano | | 0.200 | Glass | 1.517 | 64.2 | — |
| 13 | | Plano | | 0.291 | | | | |
| 14 | Image | Plano | | — | | | | |

Note:
Reference wavelength is 587.6 nm (d-line).

TABLE 12

Aspheric Coefficients

| Surface # | 2 | 3 | 4 | 5 | 6 |
|---|---|---|---|---|---|
| k = | −7.6094E+00 | 1.0000E+00 | 1.7045E+00 | −5.0000E+01 | −3.6190E+00 |
| A4 = | −5.7199E−02 | −3.2711E−01 | −2.3006E−01 | 6.7552E−02 | 5.5401E−02 |
| A6 = | −2.0058E−01 | −1.1271E−01 | −4.7523E−01 | −4.5521E−01 | −6.0861E−02 |
| A8 = | −5.6842E−02 | −4.7366E−01 | 2.7181E−02 | −6.2381E−02 | −1.5905E−01 |
| A10 = | −5.7656E−01 | 1.8826E+00 | −6.1544E−01 | 5.7022E−02 | 1.4997E−01 |
| A12 = | 2.6170E+00 | −3.8974E+00 | 1.2508E+00 | 1.0799E−01 | 9.7723E−02 |
| A14 = | −4.5231E+00 | 2.6993E+00 | −2.0966E+00 | −1.0177E−01 | 4.4465E−02 |
| A16 = | −3.0630E+00 | 1.8005E+00 | 2.6321E+00 | −4.8071E−03 | −9.2247E−02 |

| Surface # | 7 | 8 | 9 | 10 | 11 |
|---|---|---|---|---|---|
| k = | −6.5578E−01 | −1.0000E+00 | −5.0000E+01 | −6.4816E+00 | −1.2977E+00 |
| A4 = | −1.6603E−01 | −4.6917E−01 | −4.3032E−01 | −1.5128E−02 | −1.4842E−01 |
| A6 = | 1.4735E−01 | −6.8452E−02 | 1.8765E−01 | −1.4621E−01 | 2.7402E−02 |
| A8 = | 1.8130E−02 | 1.6297E−01 | −6.7613E−02 | 1.1819E−01 | 2.4100E−04 |
| A10 = | 9.4403E−03 | 8.7198E−02 | 1.4160E−02 | −3.9362E−02 | −1.1328E−03 |
| A12 = | 7.5740E−04 | 3.0288E−03 | 1.8490E−04 | 4.3985E−03 | 1.1229E−04 |
| A14 = | −8.1571E−04 | −2.1220E−02 | −6.7951E−03 | | |
| A16 = | 4.3084E−02 | −6.7150E−03 | 1.3202E−03 | | |

In the image lens assembly according to the 6th embodiment, the definitions of these parameters shown in the following table are the same as those stated in the 1st embodiment with corresponding values for the 6th embodiment. Moreover, these parameters can be calculated from Table 11 and Table 12 as the following values and satisfy the following conditions:

| 6th Embodiment | | | |
|---|---|---|---|
| f [mm] | 2.67 | |Sag41|/CT4 | 1.81 |
| Fno | 2.45 | (R3 + R4)/(R3 − R4) | −0.74 |
| HFOV [deg.] | 42.8 | (R6 + R7)/(R6 − R7) | −2.46 |
| V2/V4 | 2.35 | |f2/f1| | 1.09 |
| (T12 + T23 + T34 + T45)/f | 0.17 | FOV [deg.] | 85.6 |
| SL/TL | 0.99 | TL/ImgH | 1.60 |
| TL/R2 | −0.06 | | |

7th Embodiment

Figure 13:
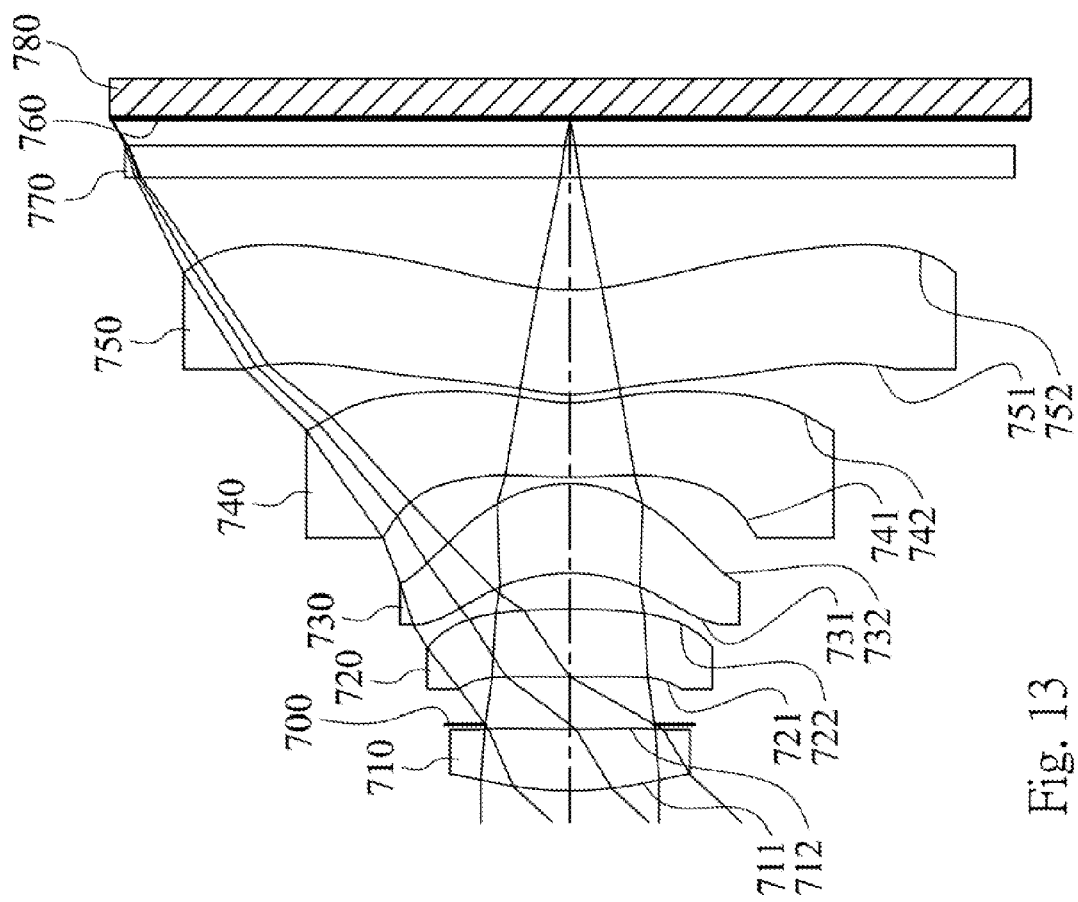
FIG. 13 is a schematic view of an image lens assembly according to the 7th embodiment of the present disclosure.
Figure 14:
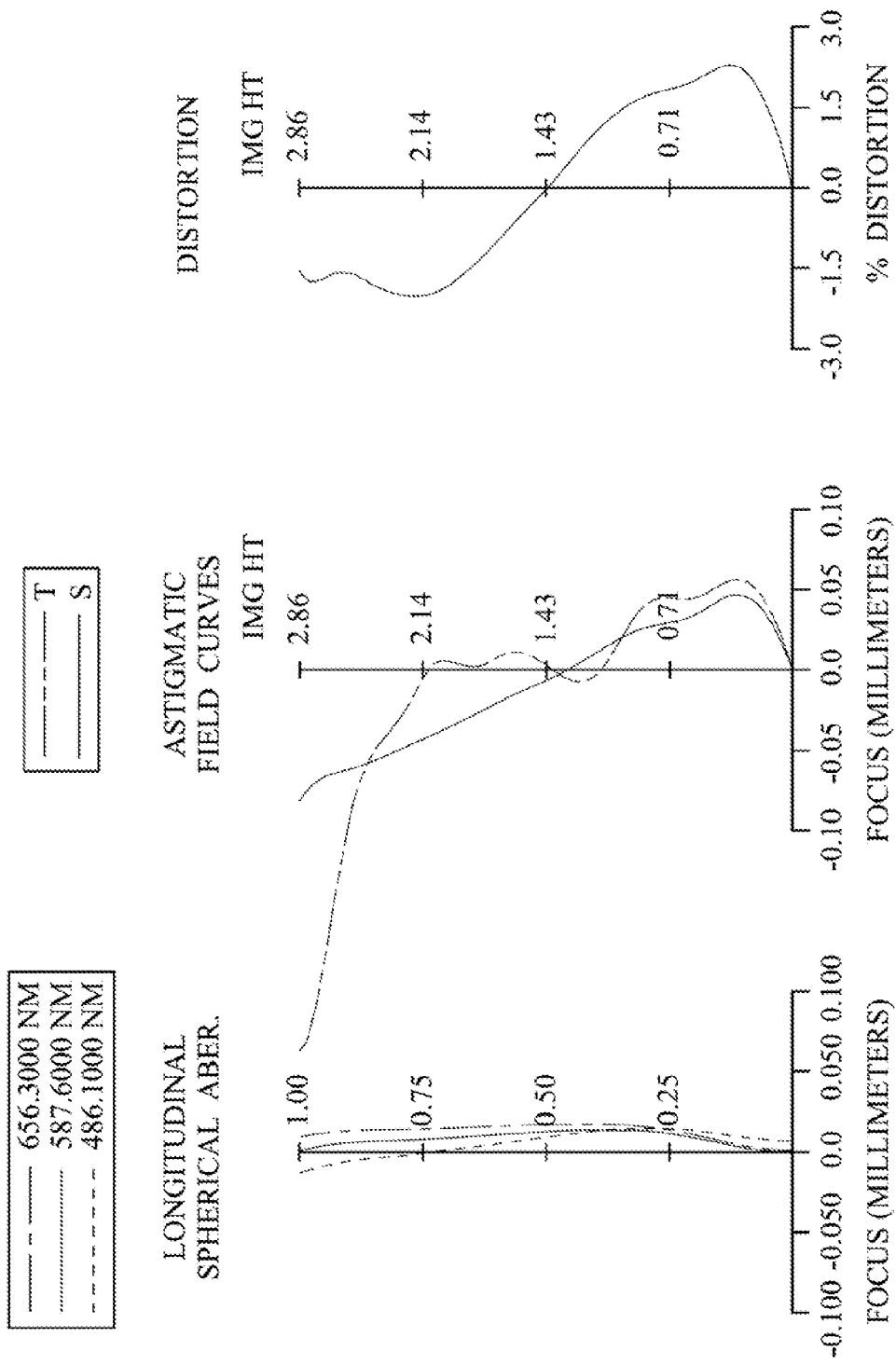
FIG. 14 shows spherical aberration curves, astigmatic field curves and a distortion curve of the image lens assembly according to the 7th embodiment.

FIG. 13 is a schematic view of an image lens assembly according to the 7th embodiment of the present disclosure. FIG. 14 shows spherical aberration curves, astigmatic field curves and a distortion curve of the image lens assembly according to the 7th embodiment. In FIG. 13, the image lens assembly includes five lens elements with refractive power, in order from an object side to an image side, a first lens element 710, an aperture stop 700, a second lens element 720, a third lens element 730, a fourth lens element 740, a fifth lens element 750, an IR-cut filter 770, an image plane 760 and an image sensor 780, wherein the image lens assembly has a total of five lens elements (710-750) with refractive power, and each of the five lens elements (710-750) is separated from each other.

The first lens element 710 with positive refractive power has a convex object-side surface 711 in a paraxial region thereof and a concave image-side surface 712 in a paraxial region thereof. The first lens element 710 is made of plastic material and has the object-side surface 711 and the image-side surface 712 being aspheric.

The second lens element 720 with positive refractive power has a convex object-side surface 721 in a paraxial region thereof and a convex image-side surface 722 in a paraxial region thereof. The second lens element 720 is made of plastic material and has the object-side surface 721 and the image-side surface 722 being aspheric.

The third lens element 730 with positive refractive power has a concave object-side surface 731 in a paraxial region thereof and a convex image-side surface 732 in a paraxial region thereof. The third lens element 730 is made of plastic material and has the object-side surface 731 and the image-side surface 732 being aspheric.

The fourth lens element 740 with negative refractive power has a convex object-side surface 741 in a paraxial region thereof and a concave image-side surface 742 in a paraxial region thereof, wherein the image-side surface 742 of the fourth lens element 740 has at least one convex shape in an off-axis region thereof. The fourth lens element 740 is made of plastic material and has the object-side surface 741 and the image-side surface 742 being aspheric.

The fifth lens element 750 with positive refractive power has a convex object-side surface 751 in a paraxial region thereof and a concave image-side surface 752 in a paraxial region thereof, wherein the image-side surface 752 of the fifth lens element 750 has at least one convex shape in an off-axis region thereof. The fifth lens element 750 is made of plastic material and has the object-side surface 751 and the image-side surface 752 being aspheric.

The IR-cut filter 770 is made of glass material located between the fifth lens element 750 and the image plane 760, and will not affect the focal length of the image lens assembly. The image lens assembly further includes an image sensor 780 located on the image plane 760.

The detailed optical data of the 7th embodiment are shown in Table 13 and the aspheric surface data are shown in Table 14 below.

TABLE 13

7th Embodiment
f = 2.72 mm, Fno = 2.45, HFOV = 46.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.188 | ASP | 0.383 | Plastic | 1.544 | 55.9 | 4.80 |
| 2 | | 12.632 | ASP | 0.027 | | | | |
| 3 | Ape. Stop | Plano | | 0.296 | | | | |
| 4 | Lens 2 | 15.345 | ASP | 0.425 | Plastic | 1.544 | 55.9 | 7.40 |
| 5 | | −5.407 | ASP | 0.221 | | | | |
| 6 | Lens 3 | −1.066 | ASP | 0.561 | Plastic | 1.544 | 55.9 | 4.00 |
| 7 | | −0.849 | ASP | 0.041 | | | | |
| 8 | Lens 4 | 3.775 | ASP | 0.463 | Plastic | 1.650 | 21.4 | −1.59 |
| 9 | | 0.772 | ASP | 0.051 | | | | |
| 10 | Lens 5 | 0.726 | ASP | 0.653 | Plastic | 1.544 | 55.9 | 1.99 |
| 11 | | 1.512 | ASP | 0.700 | | | | |
| 12 | IR-cut filter | Plano | | 0.200 | Glass | 1.517 | 64.2 | — |
| 13 | | Plano | | 0.170 | | | | |
| 14 | Image | Plano | | — | | | | |

Note:
Reference wavelength is 587.6 nm (d-line).

TABLE 14

Aspheric Coefficients

| Surface # | 1 | 2 | 4 | 5 | 6 |
|---|---|---|---|---|---|
| k = | 5.2772E−01 | 1.0000E+00 | −4.9959E+01 | 1.7980E+01 | −4.6788E+00 |
| A4 = | −3.4266E−02 | −8.0267E−02 | −1.5833E−01 | −1.0926E−01 | −2.1310E−01 |
| A6 = | −1.1618E−01 | −1.8620E−01 | −2.5361E−01 | −9.5155E−02 | −5.4449E−01 |
| A8 = | 1.3792E−01 | 3.2938E−02 | −2.0226E−01 | −9.4075E−02 | 1.8894E+00 |
| A10 = | −1.7707E−01 | 4.7509E−01 | −4.3417E−01 | −1.6476E−02 | −1.7996E+00 |
| A12 = | −4.4884E−01 | −1.9980E+00 | −3.2621E−01 | −1.7600E−02 | 8.3118E−01 |
| A14 = | 6.8414E−01 | 1.3292E+00 | −2.0491E+00 | −9.9373E−02 | −1.9132E−01 |
| A16 = | −3.3394E−01 | 3.4668E−02 | 2.0627E+00 | 1.6115E−01 | 2.1871E−02 |

| Surface # | 7 | 8 | 9 | 10 | 11 |
|---|---|---|---|---|---|
| k = | −6.7303E−01 | 5.7197E+00 | −2.3876E+01 | −2.4751E+01 | −1.1264E+01 |
| A4 = | 1.3692E−02 | −5.3893E−01 | −2.7172E−01 | −2.1758E−01 | −6.4325E−03 |
| A6 = | −6.8519E−01 | 3.6319E−01 | 2.0334E−01 | 2.8097E−01 | −2.5217E−02 |
| A8 = | 3.1259E+00 | 3.9164E−01 | −2.6890E−02 | −1.6775E−01 | 2.0029E−02 |
| A10 = | −6.8233E+00 | −1.7118E+00 | −4.4315E−02 | 5.4959E−02 | −7.4492E−03 |
| A12 = | 8.4719E+00 | 2.2887E+00 | 2.2495E−02 | −1.0291E−02 | 1.5031E−03 |
| A14 = | −5.4082E+00 | −1.4750E+00 | −3.9733E−03 | 1.0305E−03 | −1.5945E−04 |
| A16 = | 1.3887E+00 | 3.6859E−01 | 2.5560E−04 | −4.2462E−05 | 6.8980E−06 |

In the image lens assembly according to the 7th embodiment, the definitions of these parameters shown in the following table are the same as those stated in the 1st embodiment with corresponding values for the 7th embodiment. Moreover, these parameters can be calculated from Table 13 and Table 14 as the following values and satisfy the following conditions:

| 7th Embodiment | | | |
|---|---|---|---|
| f [mm] | 2.72 | |Sag41|/CT4 | 0.82 |
| Fno | 2.45 | (R3 + R4)/(R3 − R4) | 0.48 |
| HFOV [deg.] | 46.8 | (R6 + R7)/(R6 − R7) | −0.63 |
| V2/V4 | 2.61 | |f2/f1| | 1.54 |
| (T12 + T23 + T34 + T45)/f | 0.23 | FOV [deg.] | 93.6 |
| SL/TL | 0.90 | TL/ImgH | 1.47 |
| TL/R2 | 0.33 | | |

8th Embodiment

Figure 15:
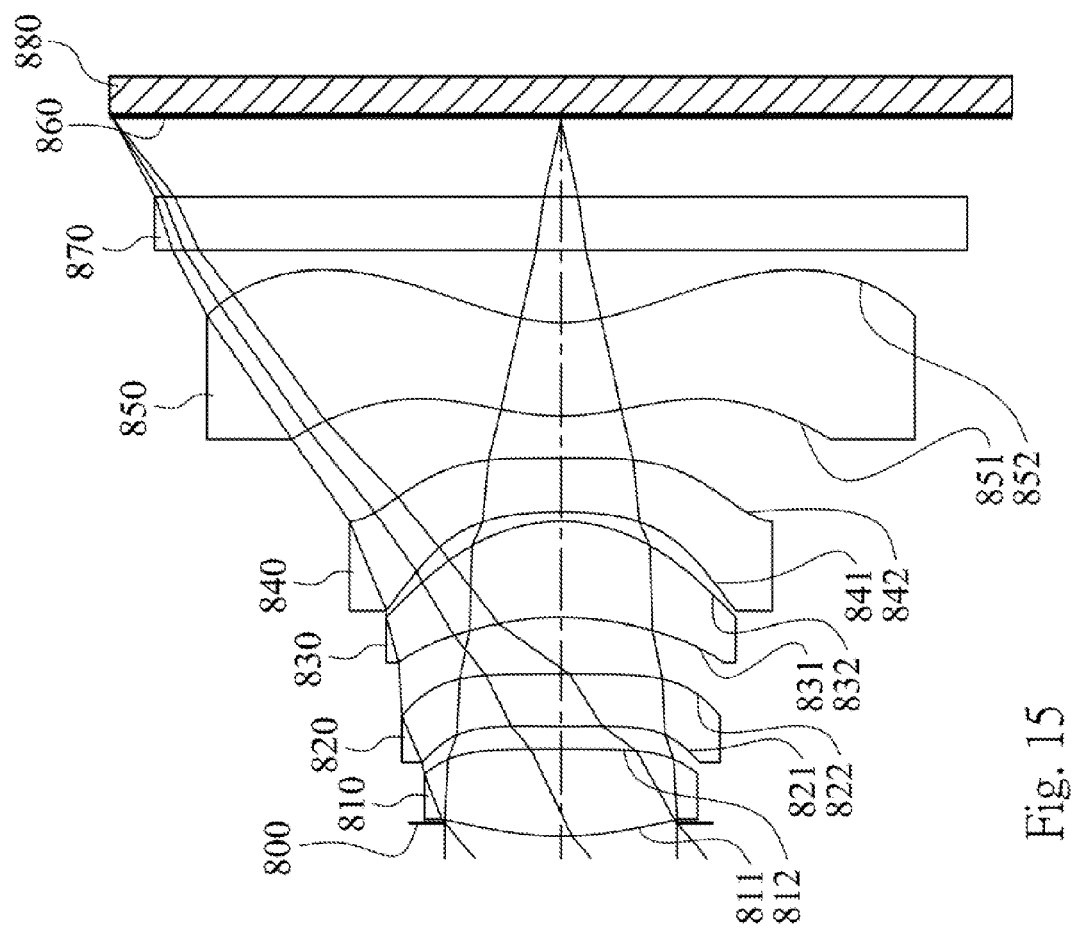
FIG. 15 is a schematic view of an image lens assembly according to the 8th embodiment of the present disclosure.
Figure 16:
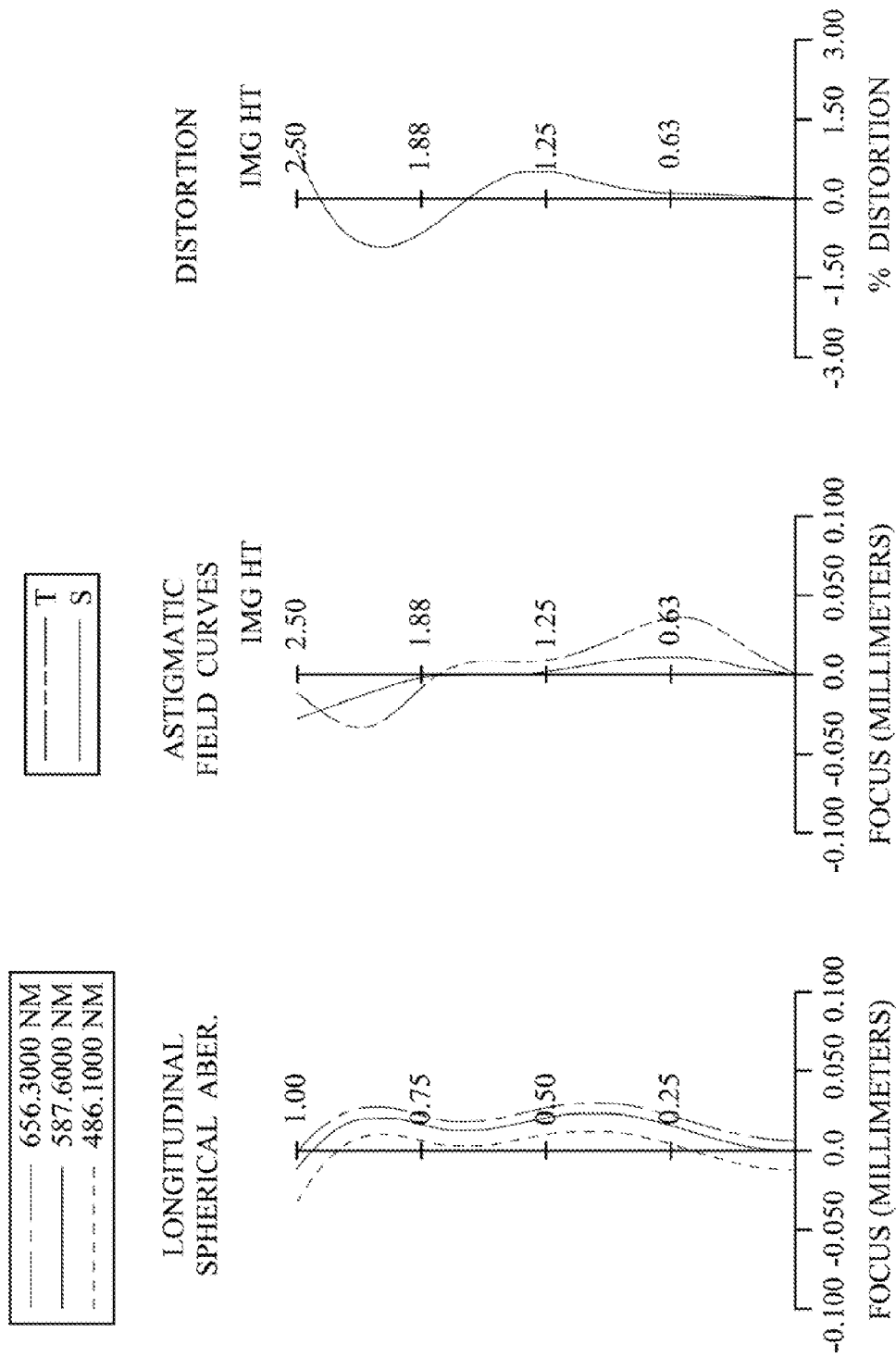
FIG. 16 shows spherical aberration curves, astigmatic field curves and a distortion curve of the image lens assembly according to the 8th embodiment.

FIG. 15 is a schematic view of an image lens assembly according to the 8th embodiment of the present disclosure. FIG. 16 shows spherical aberration curves, astigmatic field curves and a distortion curve of the image lens assembly according to the 8th embodiment. In FIG. 15, the image lens assembly includes five lens elements with refractive power, in order from an object side to an image side, an aperture stop 800, a first lens element 810, a second lens element 820, a third lens element 830, a fourth lens element 840, a fifth lens element 850, an IR-cut filter 870, an image plane 860 and an image sensor 880, wherein the image lens assembly has a total of five lens elements (810-850) with refractive power, and each of the five lens elements (810-850) is separated from each other.

The first lens element 810 with positive refractive power has a convex object-side surface 811 in a paraxial region thereof and a planar image-side surface 812 in a paraxial region thereof. The first lens element 810 is made of glass material and has the object-side surface 811 and the image-side surface 812 being aspheric.

The second lens element 820 with positive refractive power has a convex object-side surface 821 in a paraxial region thereof and a convex image-side surface 822 in a paraxial region thereof. The second lens element 820 is made of plastic material and has the object-side surface 821 and the image-side surface 822 being aspheric.

The third lens element 830 with positive refractive power has a concave object-side surface 831 in a paraxial region thereof and a convex image-side surface 832 in a paraxial region thereof. The third lens element 830 is made of plastic material and has the object-side surface 831 and the image-side surface 832 being aspheric.

The fourth lens element 840 with negative refractive power has a concave object-side surface 841 in a paraxial region thereof and a concave image-side surface 842 in a paraxial region thereof, wherein the image-side surface 842 of the fourth lens element 840 has at least one convex shape in an off-axis region thereof. The fourth lens element 840 is made of plastic material and has the object-side surface 841 and the image-side surface 842 being aspheric.

The fifth lens element 850 with negative refractive power has a convex object-side surface 851 in a paraxial region thereof and a concave image-side surface 852 in a paraxial region thereof, wherein the image-side surface 852 of the fifth lens element 850 has at least one convex shape in an off-axis region thereof. The fifth lens element 850 is made of plastic material and has the object-side surface 851 and the age-side surface 852 being aspheric.

The IR-cut filter 870 is made of glass material located between the fifth lens element 850 and the image plane 860, and will not affect the focal length of the image lens assembly. The image lens assembly further includes an image sensor 880 located on the image plane 860.

The detailed optical data of the 8th embodiment are shown in Table 15 and the aspheric surface data are shown in Table 16 below.

TABLE 15

8th Embodiment
f = 2.94 mm, Fno = 2.28, HFOV = 40.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.073 | | | | |
| 2 | Lens 1 | 1.938 | ASP | 0.482 | Glass | 1.542 | 62.9 | 3.57 |
| 3 | | ∞ | ASP | 0.124 | | | | |
| 4 | Lens 2 | 19.266 | ASP | 0.294 | Plastic | 1.544 | 55.9 | 21.08 |
| 5 | | −28.194 | ASP | 0.314 | | | | |
| 6 | Lens 3 | −1.603 | ASP | 0.536 | Plastic | 1.544 | 55.9 | 3.18 |
| 7 | | −0.930 | ASP | 0.050 | | | | |
| 8 | Lens 4 | −2.824 | ASP | 0.300 | Plastic | 1.634 | 23.8 | −4.06 |
| 9 | | 30.151 | ASP | 0.235 | | | | |
| 10 | Lens 5 | 1.315 | ASP | 0.519 | Plastic | 1.583 | 30.2 | −12.30 |
| 11 | | 0.950 | ASP | 0.400 | | | | |
| 12 | IR-cut filter | Plano | | 0.300 | Glass | 1.517 | 64.2 | — |
| 13 | | Plano | | 0.449 | | | | |
| 14 | Image | Plano | | — | | | | |

Note:
Reference wavelength is 587.6 nm (d-line).

TABLE 16

Aspheric Coefficients

| Surface # | 2 | 3 | 4 | 5 | 6 |
|---|---|---|---|---|---|
| k = | −8.9334E+00 | 1.0000E+00 | 5.0000E+01 | −5.0000E+01 | −2.6605E+00 |
| A4 = | 7.1450E−02 | −2.2135E−01 | −2.8589E−01 | −7.7378E−02 | 1.0682E−01 |
| A6 = | 4.0897E−02 | −3.3388E−01 | −6.0649E−01 | −4.4545E−01 | −1.0289E−01 |
| A8 = | −5.2942E−01 | −3.3395E−01 | −5.0799E−02 | −1.6735E−03 | −2.2289E−01 |
| A10 = | −9.8043E−01 | 1.9062E+00 | −5.4365E−01 | 7.8956E−02 | 1.1504E−01 |
| A12 = | 3.8295E+00 | −4.1868E+00 | 1.4490E+00 | 1.1753E−01 | 8.7674E−02 |
| A14 = | −1.0101E+00 | 2.2554E+00 | −1.8080E+00 | −9.2850E−02 | 4.7907E−02 |
| A16 = | −5.4552E+00 | 1.7976E+00 | 2.9826E+00 | −3.1654E−03 | −8.4203E−02 |

| Surface # | 7 | 8 | 9 | 10 | 11 |
|---|---|---|---|---|---|
| k = | −7.0224E−01 | −1.0000E+00 | −5.0000E+01 | −8.2030E+00 | −4.5709E+00 |
| A4 = | −5.4137E−02 | −5.4375E−01 | −5.2749E−01 | −1.7003E−01 | −8.3413E−02 |
| A6 = | 9.7979E−02 | −1.0649E−01 | 2.0051E−01 | −5.9896E−02 | 1.3913E−02 |
| A8 = | −3.2463E−02 | 1.5720E−01 | 1.0421E−02 | 1.1044E−01 | −7.4153E−04 |
| A10 = | −1.3333E−02 | 8.9115E−02 | 2.2786E−02 | −4.5839E−02 | −2.6314E−04 |
| A12 = | −4.8608E−03 | 7.9310E−03 | 2.5493E−03 | 6.2997E−03 | 1.9469E−05 |
| A14 = | −6.8756E−04 | −1.3119E−02 | −7.5494E−03 | | |
| A16 = | 4.6229E−02 | 1.1984E−03 | 4.7325E−04 | | |

In the image lens assembly according to the 8th embodiment, the definitions of these parameters shown in the following table are the same as those stated in the 1st embodiment with corresponding values for the 8th embodiment. Moreover, these parameters can be calculated from Table 15 and Table 16 as the following values and satisfy the following conditions:

8th Embodiment

| | | | |
|---|---|---|---|
| f [mm] | 2.94 | |Sag41|/CT4 | 1.83 |
| Fno | 2.28 | (R3 + R4)/(R3 − R4) | −0.19 |
| HFOV [deg.] | 40.0 | (R6 + R7)/(R6 − R7) | −1.98 |
| V2/V4 | 2.35 | |f2/f1| | 5.90 |
| (T12 + T23 + T34 + T45)/f | 0.25 | FOV [deg.] | 80.0 |
| SL/TL | 0.98 | TL/ImgH | 1.60 |
| TL/R2 | 0.00 | | |

9th Embodiment

Figure 17:
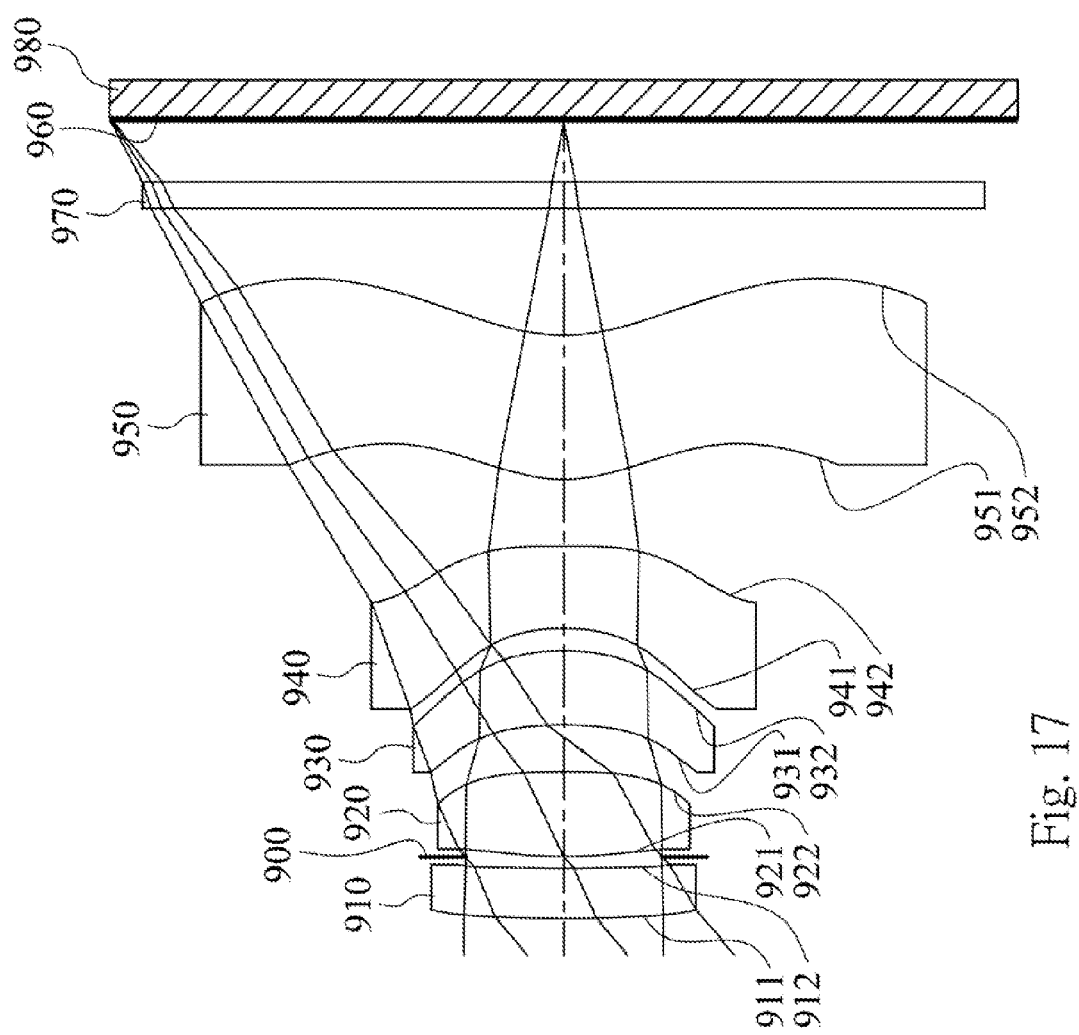
FIG. 17 is a schematic view of an image lens assembly according to the 9th embodiment of the present disclosure.
Figure 18:
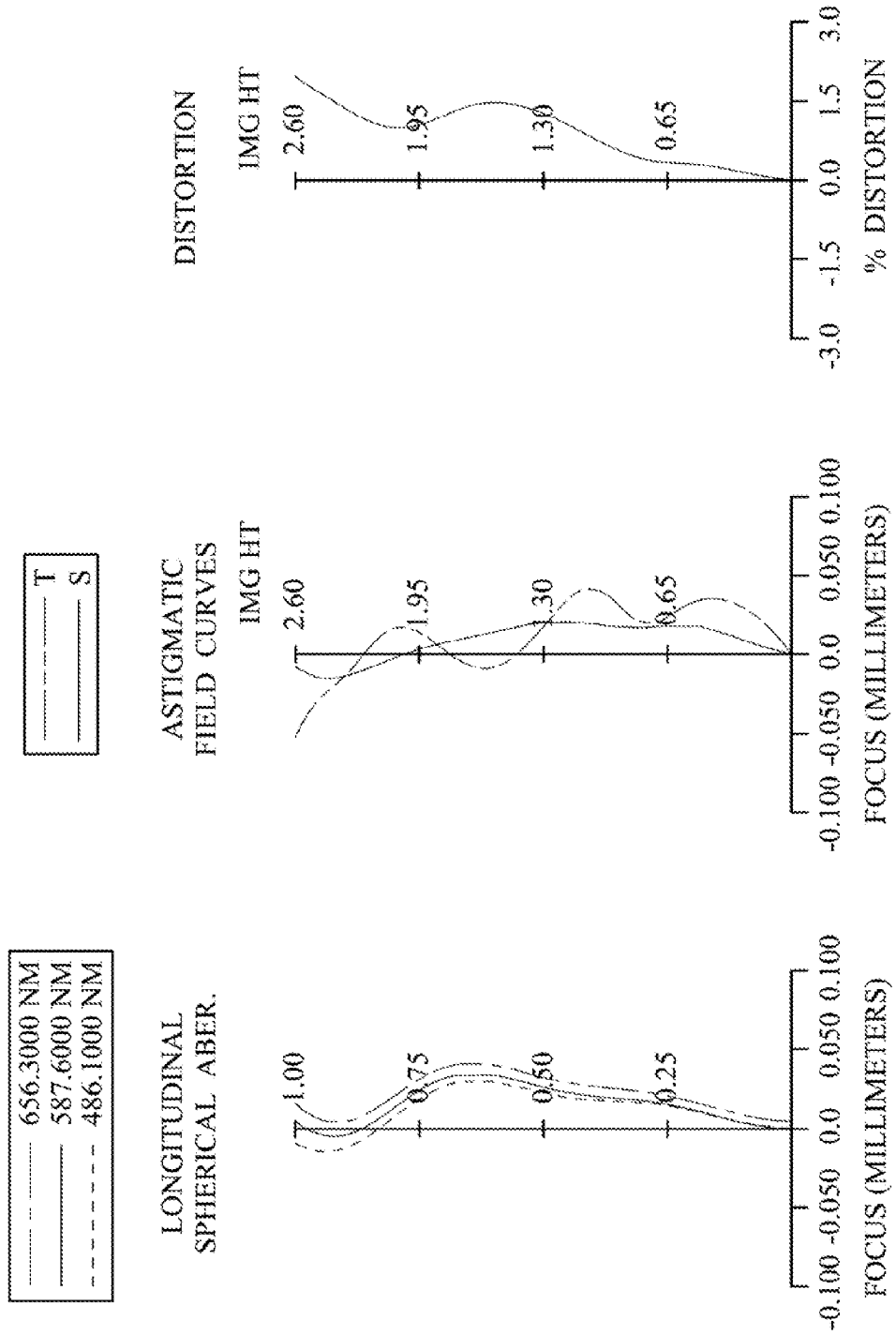
FIG. 18 shows spherical aberration curves, astigmatic field curves and a distortion curve of the image lens assembly according to the 9th embodiment.

FIG. 17 is a schematic view of an image lens assembly according to the 9th embodiment of the present disclosure. FIG. 18 shows spherical aberration curves, astigmatic field curves and a distortion curve of the image lens assembly according to the 9th embodiment. In FIG. 17, the image lens assembly includes five lens elements with refractive power, in order from an object side to an image side, a first lens element 910, an aperture stop 900, a second lens element 920, a third lens element 930, a fourth lens element 940, a fifth lens element 950, an IR-cut filter 970, an image plane 960 and an image sensor 980, wherein the image lens assembly has a total of five lens elements (910-950) with refractive power, and each of the five lens elements (910-950) is separated from each other.

The first lens element 910 with positive refractive power has a convex object-side surface 911 in a paraxial region thereof and a concave image-side surface 912 in a paraxial region thereof. The first lens element 910 is made of plastic material and has the object-side surface 911 and the image-side surface 912 being aspheric.

The second lens element 920 with positive refractive power has a convex object-side surface 921 in a paraxial region thereof and a convex image-side surface 922 in a paraxial region thereof. The second lens element 920 is made of plastic material and has the object-side surface 921 and the image-side surface 922 being aspheric.

The third lens element 930 with positive refractive power has a concave object-side surface 931 in a paraxial region thereof and a convex image-side surface 932 in a paraxial region thereof. The third lens element 930 is made of plastic material and has the object-side surface 931 and the image-side surface 932 being aspheric.

The fourth lens element 940 with negative refractive power has a concave object-side surface 941 in a paraxial region thereof and a concave image-side surface 942 in a paraxial region thereof, wherein the image-side surface 942 of the fourth lens element 940 has at least one convex shape in an off-axis region thereof. The fourth lens element 940 is made of plastic material and has the object-side surface 941 and the image-side surface 942 being aspheric.

The fifth lens element 950 with positive refractive power has a convex object-side surface 951 in a paraxial region thereof and a concave image-side surface 952 in a paraxial region thereof, wherein the image-side surface 952 of the fifth lens element 950 has at least one convex shape in an off-axis region thereof. The fifth lens element 950 is made of plastic material and has the object-side surface 951 and the image-side surface 952 being aspheric.

The IR-cut filter 970 is made of glass material located between the fifth lens element 950 and the image plane 960 and will not affect the focal length of the image lens assembly. The image lens assembly further includes an image sensor 980 located on the image plane 960.

The detailed optical data of the 9th embodiment are shown in Table 17 and the aspheric surface data are shown in Table 18 below.

TABLE 17

9th Embodiment
f = 2.86 mm, Fno = 2.60, HFOV = 40.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 7.797 | ASP | 0.279 | Plastic | 1.634 | 23.8 | 95.35 |
| 2 | | 8.828 | ASP | 0.064 | | | | |
| 3 | Ape. Stop | Plano | | 0.001 | | | | |
| 4 | Lens 2 | 2.236 | ASP | 0.469 | Plastic | 1.544 | 55.9 | 2.91 |
| 5 | | −5.043 | ASP | 0.256 | | | | |
| 6 | Lens 3 | −1.974 | ASP | 0.412 | Plastic | 1.544 | 55.9 | 5.19 |
| 7 | | −1.247 | ASP | 0.121 | | | | |
| 8 | Lens 4 | −1.254 | ASP | 0.456 | Plastic | 1.650 | 21.4 | −1.90 |
| 9 | | 75.951 | ASP | 0.367 | | | | |
| 10 | Lens 5 | 0.818 | ASP | 0.800 | Plastic | 1.583 | 30.2 | 2.75 |
| 11 | | 1.065 | ASP | 0.700 | | | | |
| 12 | IR-cut filter | Plano | | 0.145 | Glass | 1.517 | 64.2 | — |
| 13 | | Plano | | 0.346 | | | | |
| 14 | Image | Plano | | — | | | | |

Note:
Reference wavelength is 587.6 nm (d-line).

TABLE 18

Aspheric Coefficients

| Surface # | 1 | 2 | 4 | 5 | 6 |
|---|---|---|---|---|---|
| k = | −4.2484E+01 | 1.0000E+00 | −3.1268E+00 | 2.8455E+01 | 1.9094E+00 |
| A4 = | −3.6993E−02 | −2.9204E−01 | −4.9799E−01 | −3.9926E−01 | −2.2117E−01 |
| A6 = | 1.1049E−01 | 1.0947E+00 | 2.9408E+00 | −4.0346E−01 | −2.0378E+00 |
| A8 = | 2.9489E−01 | −8.1292E−01 | −2.6890E+01 | 2.2541E+00 | 1.1818E+01 |
| A10 = | −8.2487E−01 | −1.6758E+00 | 1.6618E+02 | −1.3359E+01 | −4.4754E+01 |
| A12 = | 6.2074E−01 | 6.7151E+00 | −5.9514E+02 | 3.9591E+01 | 9.2490E+01 |
| A14 = | 1.5195E+00 | −1.4610E+00 | 1.1133E+03 | −5.6452E+01 | −9.0263E+01 |
| A16 = | −1.7965E+00 | 6.5913E−01 | −8.4755E+02 | 3.0476E+01 | 3.4039E+01 |

| Surface # | 7 | 8 | 9 | 10 | 11 |
|---|---|---|---|---|---|
| k = | −9.4868E−03 | −1.6874E+01 | −5.0000E+01 | −3.7871E+00 | −2.1991E+00 |
| A4 = | −2.5635E−01 | −1.9546E+00 | −1.3870E+00 | −2.4867E−01 | −2.0688E−01 |
| A6 = | −3.2410E+00 | 2.5408E+00 | 3.0348E+00 | 8.1946E−02 | 1.1315E−01 |
| A8 = | 1.7227E+01 | −1.5949E+00 | −5.1662E+00 | 1.3728E−02 | −4.2246E−02 |
| A10 = | −4.2012E+01 | 5.0564E+00 | 6.0577E+00 | −4.3614E−02 | 8.4177E−03 |
| A12 = | 5.7468E+01 | −1.0368E+01 | −4.0493E+00 | 3.2424E−02 | −4.3197E−04 |
| A14 = | −4.1872E+01 | 8.1175E+00 | 1.3923E+00 | −1.0774E−02 | −1.0659E−04 |
| A16 = | 1.2954E+01 | −2.1040E+00 | −1.9241E−01 | 1.3167E−03 | 1.2414E−05 |

In the image lens assembly according to the 9th embodiment, the definitions of these parameters shown in the following table are the same as those stated in the 1st embodiment with corresponding values for the 9th embodiment. Moreover, these parameters can be calculated from Table 17 and Table 18 as the following values and satisfy the following conditions:

|  | 9th Embodiment |  |  |
| --- | --- | --- | --- |
| f [mm] | 2.86 | \|Sag41\|/CT4 | 0.98 |
| Fno | 2.60 | (R3 + R4)/(R3 − R4) | −0.39 |
| HFOV [deg.] | 40.5 | (R6 + R7)/(R6 − R7) | −347.46 |
| V2/V4 | 2.61 | \|f2/f1\| | 0.03 |
| (T12 + T23 + T34 + T45)/f | 0.28 | FOV [deg.] | 81.0 |
| SL/TL | 0.92 | TL/ImgH | 1.77 |
| TL/R2 | 0.50 |  |  |

The foregoing description, for purpose of explanation, has been described with reference to specific embodiments. It is to be noted that TABLES 1-18 show different data of the different embodiments; however, the data of the different embodiments are obtained from experiments. The embodiments were chosen and described in order to best explain the principles of the disclosure and its practical applications to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image lens assembly comprising, in order from an object side to an image side:
   a first lens element having refractive power;
   a second lens element with positive refractive power having a convex image-side surface in a paraxial region thereof;
   a third lens element having positive refractive power;
   a fourth lens element with refractive power having a concave image-side surface in a paraxial region thereof, wherein an object-side surface and the image-side surface of the fourth lens element are aspheric; and
   a fifth lens element with refractive power having a concave image-side surface in a paraxial region thereof, wherein the image-side surface of the fifth lens element has at least one convex shape in an off-axis region thereof, and an object-side surface and the image-side surface of the fifth lens element are aspheric;
   wherein the image lens assembly has a total of five lens elements with refractive power, each of the five lens elements of the image lens assembly is separated from each other, an axial distance between an object-side surface of the first lens element and an image plane is TL, a curvature radius of an image-side surface of the first lens element is R2, a curvature radius of an object-side-surface of the second lens element is R3, a curvature radius of the image-side surface of the second lens element is R4, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, a focal length of the image lens assembly is f, and the following conditions are satisfied:

$TL/R2<3.0;$ $-1.0<(R3+R4)/(R3-R4)<0.5;$ and $(T12+T23+T34+T45)/f<0.35.$

2. The image lens assembly of claim 1, wherein the object-side surface of the first lens element is convex in a paraxial region thereof.

3. The image lens assembly of claim 2, wherein the fourth lens element has negative refractive power.

4. The image lens assembly of claim 3, wherein the object-side surface of the fifth lens element is convex in a paraxial region thereof.

5. The image lens assembly of claim 4, further comprising:
   an image sensor located on the image plane, wherein the axial distance between the object-side surface of the first lens element and the image plane is TL a maximum image height of the image lens assembly is ImgH, and the following condition is satisfied:

$TL/ImgH<2.0.$

6. The image lens assembly of claim 4, wherein the image-side surface of the fourth lens element has at least one convex shape in an off-axis region thereof.

7. The image lens assembly of claim 4, further comprising:
   a stop disposed between an imaged object and the second lens element, wherein an axial distance between the stop and the image plane is SL, the axial distance between the object-side surface of the first lens element and the image plane is TL, and the following condition is satisfied:

$0.8<SL/TL<1.2.$

8. The image lens assembly of claim 4, wherein the fifth lens element has positive refractive power.

9. The image lens assembly of claim 4, wherein an Abbe number of the second lens element is V2, an Abbe number of the fourth lens element is V4, and the following condition is satisfied:

$1.5<V2/V4<3.0.$

10. An image capturing device, comprising:
    the image lens assembly of claim 1; and
    an image sensor located on the image plane of the image lens assembly.

11. The image lens assembly of claim 1, wherein the first leas element positive refractive power.

12. The image lens assembly of claim 1, wherein a curvature radius of an image-side surface of the third lens element is R6, a curvature radius of the object-side surface of the fourth lens element is R7, and the following condition is satisfied:

$-6.0<(R6+R7)/(R6-R7)<0.$

13. The image lens assembly of claim 1, wherein the third lens element has a concave object-side surface in a paraxial region thereof and a convex image-side surface in a paraxial region thereof.

14. The image lens assembly of claim 13, wherein the axial distance between an object-side surface of the first lens element and the image plane is TL, the curvature radius of the image-side surface of the first lens element is R2, and the following condition is satisfied:

$-1.0<TL/R2<20.$

15. The image lens assembly of claim 13, wherein a distance in parallel with an optical axis from an axial vertex on the object-side surface of the fourth lens element to a maximum effective diameter position on the object-side surface of the fourth lens element is SAG41, a central thickness of the fourth lens element is CT4, and the following condition is satisfied:

$1.2 < |Sag41|/CT4.$

16. The image lens assembly of claim 13, wherein a maximal field of view of the image lens assembly is FOV, the following condition is satisfied:

80 degrees < FOV < 105 degrees.

17. The image lens assembly of claim 1, wherein a focal length of the first lens element is f1, a focal length of the second lens element is f2, and the following condition is satisfied:

$f2/f1 < 1.25.$

18. An image lens assembly comprising, in order from an object side to an image side:
 a first lens element having positive refractive power;
 a second lens element with positive refractive power having a convex image-side surface in a paraxial region thereof;
 a third lens element having positive refractive power;
 a fourth lens element with refractive power having a concave image-side surface in a paraxial region thereof, wherein an object-side surface and the image-side surface of the fourth lens element are aspheric; and
 a fifth lens element with refractive power having a concave image-side surface in a paraxial region thereof, wherein the image-side surface of the fifth lens element has at least one convex shape in an off-axis region thereof, and an object-side surface and the image-side surface of the fifth lens element are aspheric;
 wherein the image lens assembly has a total of five lens elements with refractive power, and each of the five lens elements of the image lens assembly is separated from each other, a curvature radius of an object-side surface of the second lens element is R3, a curvature radius of the image-side surface of the second lens element is R4, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, a focal length of the image lens assembly is f, and the following conditions are satisfied:

$-1.0 < (R3+R4)/(R3-R4) < 0.5;$ and $(T12+T23+T34+T45)/f < 0.35.$

19. The image lens assembly of claim 18, wherein the fourth lens element has negative refractive power.

20. The image lens assembly of claim 18, wherein an axial distance between an object-side surface of the first lens element and an image plane is TL, a curvature radius of an image-side surface of the first lens element is R2, and the following condition is satisfied:

$-1.0 < TL/R2 < 2.0.$

21. The image lens assembly of claim 18, wherein a distance in parallel with an optical axis from an axial vertex on the object-side surface of the fourth lens element to a maximum effective diameter position on the object-side surface of the fourth lens element is SAG41 a central thickness of the fourth lens element is CT4, and the following condition is satisfied:

$1.2 < |Sag41|/CT4.$

22. The image lens assembly of claim 18, wherein a maximal field of view of the image lens assembly is FOV, the following condition is satisfied:

80 degrees < FOV < 105 degrees.

23. The image lens assembly of claim 18, wherein the third lens element has a convex image-side surface in a paraxial region thereof and the object-side surface of the fifth lens element is convex in a paraxial region thereof.

* * * * *

UNITED STATES PATENT AND TRADEMARK OFFICE
CERTIFICATE OF CORRECTION

PATENT NO. : 9,097,877 B2  
APPLICATION NO. : 13/954987  
DATED : August 4, 2015  
INVENTOR(S) : Tsung-Han Tsai et al.

It is certified that error appears in the above-identified patent and that said Letters Patent is hereby corrected as shown below:

In the specification,
(1) In column 4, line 59 of the issued patent reads as "the fourth lens element is SAG41", but it should read as "the fourth lens element is Sag41".
(2) In column 8, line 11 of the issued patent reads as "the fourth lens element 140 is SAG41", but it should read as "the fourth lens element 140 is Sag41".
In the claims,
(3) In column 32, line 20, Claim 5 of the issued patent reads as "the image plane is TL a", but it should read as "the image plane is TL, a".
(4) In column 32, line 56, Claim 12 of the issued patent reads as "-6.0<(R6÷R7/(R6-R7)<0", but it should read as "-6.0<(R6+R7)/(R6-R7)<0".
(5) In column 32, line 67, Claim 14 of the issued patent reads as "-1.0<TL/R2<20", but it should read as "-1.0<TL/R2<2.0".
(6) In column 32, line 63, Claim 14 of the issued patent reads as "between an object-side surface", but it should read as "between the object-side surface".
(7) In column 33, line 5, Claim 15 of the issued patent reads as "the fourth lens element is SAG41", but it should read as "the fourth lens element is Sag41".
(8) In column 34, line 27, Claim 21 of the issued patent reads as "the fourth lens element is SAG41", but it should read as "the fourth lens element is Sag41".

Signed and Sealed this  
Nineteenth Day of January, 2016

Michelle K. Lee  
*Director of the United States Patent and Trademark Office*